US011685128B2

(12) United States Patent
Krajca et al.

(10) Patent No.: US 11,685,128 B2
(45) Date of Patent: Jun. 27, 2023

(54) SYSTEM AND METHOD FOR FABRICATING A COMPOSITE STRUCTURE

(71) Applicant: The Boeing Company, Chicago, IL (US)

(72) Inventors: Scott Krajca, Seattle, WA (US); Long Ly, Renton, WA (US); Chace Wilcoxson, Kent, WA (US); Darrell Jones, Mill Creek, WA (US); Kurtis Willden, Kent, WA (US); Gregory Klempel, Seattle, WA (US); Jeremy Justice, Mill Creek, WA (US); Daniel Smith, Woodinville, WA (US); Marko Oviir, Seattle, WA (US); Mark Bunker, Seattle, WA (US); Erik Lund, Mercer Island, WA (US); Wade Morris, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/515,831

(22) Filed: Nov. 1, 2021

(65) Prior Publication Data
US 2022/0176649 A1 Jun. 9, 2022

Related U.S. Application Data

(60) Provisional application No. 63/199,094, filed on Dec. 7, 2020.

(51) Int. Cl.
*B29C 31/08* (2006.01)
*B29C 70/38* (2006.01)
(Continued)

(52) U.S. Cl.
CPC .............. *B29C 70/38* (2013.01); *B29C 70/36* (2013.01); *B29C 70/545* (2013.01); *B64F 5/10* (2017.01); *B29L 2031/3082* (2013.01)

(58) Field of Classification Search
CPC ....... B29C 70/38; B29C 70/36; B29C 70/545; B29C 31/08; B29C 70/541; B29C 70/34;
(Continued)

(56) References Cited

U.S. PATENT DOCUMENTS 4,208,238 A 6/1980 August et al.
5,209,804 A * 5/1993 Trudeau ................ B65H 3/122
156/364

(Continued)

FOREIGN PATENT DOCUMENTS

EP 0 511 937 11/1992
EP 3 023 233 5/2016
(Continued)

OTHER PUBLICATIONS

Solvay: P720X Release film (Mar. 21, 2013).
European Patent Office, Extended European Search Report, App. No. 21210279.2 (dated May 6, 2022).

*Primary Examiner* — Jun S Yoo
(74) *Attorney, Agent, or Firm* — Walters & Wasylyna LLC

(57) ABSTRACT

A system for fabricating a composite structure includes a ply carrier including a ply support surface configured to support at least one composite ply. The system includes a carrier transfer device configured to convey the ply carrier. The system includes a lamination system configured to selectively apply the at least one composite ply to the ply support surface of the ply carrier. The system includes a transfer system configured to remove the ply carrier from the carrier transfer device and to apply the at least one composite ply to at least a portion of a forming surface of a forming tool.

(Continued)

The system includes a forming system configured to form the at least one composite ply over the at least a portion of the forming surface of the forming tool.

24 Claims, 13 Drawing Sheets

(51) Int. Cl.
  *B64F 5/10* (2017.01)
  *B29C 70/36* (2006.01)
  *B29C 70/54* (2006.01)
  *B29L 31/30* (2006.01)

(58) Field of Classification Search
  CPC .. B29C 31/085; B64F 5/10; B29L 2031/3082; B29L 2031/3076
  See application file for complete search history.

(56) References Cited

U.S. PATENT DOCUMENTS

| | | |
|---|---|---|
| 6,814,916 B2 | 11/2004 | Willden et al. |
| 7,118,370 B2 | 10/2006 | Willden et al. |
| 7,137,182 B2 | 11/2006 | Nelson |
| 7,651,650 B2 | 1/2010 | Willden et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,578,995 B2 | 11/2013 | Nelson |
| 8,808,490 B2 | 8/2014 | Hagman et al. |
| 9,656,829 B2 | 5/2017 | Hagman et al. |
| 9,663,247 B2 | 5/2017 | Rotter et al. |
| 10,086,596 B2 | 10/2018 | Desjardien et al. |
| 10,456,960 B2 | 10/2019 | Chapman et al. |
| 10,688,697 B2 | 6/2020 | Sundquist et al. |
| 2016/0368226 A1 | 12/2016 | Encinosa et al. |
| 2017/0144361 A1* | 5/2017 | Hills .................... B29C 51/266 |
| 2019/0308377 A1* | 10/2019 | Petrovski .............. B29C 70/543 |
| 2020/0016797 A1 | 1/2020 | Chapman et al. |
| 2020/0198261 A1* | 6/2020 | Prause .................. B29C 70/545 |
| 2021/0107182 A1 | 4/2021 | Hopkins et al. |
| 2021/0107241 A1 | 4/2021 | Hopkins et al. |
| 2021/0107242 A1 | 4/2021 | Hopkins et al. |

FOREIGN PATENT DOCUMENTS

| | | |
|---|---|---|
| EP | 3 670 159 | 6/2020 |
| EP | 3 670 160 | 6/2020 |

* cited by examiner

SYSTEM AND METHOD FOR FABRICATING A COMPOSITE STRUCTURE

PRIORITY

This application claims priority from U.S. Ser. No. 63/199,094 filed on Dec. 7, 2020.

FIELD

The present disclosure relates generally to the manufacture of composite structures and, more particularly, to systems and methods that enable ply-by-ply formation of composite structures.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating. The resulting part matches the shape of the forming tool. However, manual layup of the fiber plies is time consuming and laborious.

Some known composite manufacturing processes attempt to automate a portion of the formation operation. As an example, a drape forming process includes heating a laminate of pre-impregnated fiber plies ("composite charge") and forcing it around a mandrel with the use of a vacuum bag. However, this method has achieved limited success on thick laminates or structures with more complex shapes. As another example, a compactor may be used to compress the composite charge against a tool surface during fabrication. However, this method often requires supplemental manual formation after compaction when the tool surface and resulting structure is contoured. Accordingly, while such methods may be effective at forming relatively small and thin composite structures or composite structures with relatively simple shapes, they may be inefficient when applied to forming large composite structures or composite structures with more complex shapes.

Accordingly, those skilled in the art continue with research and development efforts in the field of composite manufacturing and, more particularly, to the manufacture of relatively large and/or relatively complex composite structures.

SUMMARY

Disclosed are examples of a system for fabricating a composite structure and a method of fabricating a composite structure. The following is a non-exhaustive list of examples, which may or may not be claimed, of the subject matter according to the present disclosure.

In an example, the system includes a ply carrier including a ply support surface configured to support at least one composite ply. The system includes a carrier transfer device configured to convey the ply carrier. The system includes a lamination system configured to selectively apply the at least one composite ply to the ply support surface of the ply carrier. The system includes a transfer system configured to remove the ply carrier from the carrier transfer device and to apply the at least one composite ply to at least a portion of a forming surface of a forming tool. The system includes a forming system configured to form the at least one composite ply over the at least a portion of the forming surface of the forming tool.

In another example, the system includes a ply carrier including a ply support surface. The system includes a carrier transfer device configured to support the ply carrier. The system includes a lamination system, a transfer system in sequential relation to the lamination system, and a forming system in sequential relation to the transfer system. The system includes a controller. The controller is programmed to selectively convey the ply carrier to the lamination system using the carrier transfer device. The controller is programmed to selectively apply at least on composite ply to the ply support surface of the ply carrier using the lamination system. The controller is programmed to selectively convey the ply carrier from the lamination system to the transfer system using the carrier transfer device. The controller is programmed to remove the ply carrier from the carrier transfer device and apply the at least one composite ply to at least a portion of a forming surface of a forming tool using the transfer system. The controller is programmed to form the at least one composite ply over the at least a portion of the forming surface of the forming tool using the forming system.

In an example, the method includes steps of: (1) conveying a ply carrier to a lamination system using a carrier transfer device; (2) selectively applying at least one composite ply to a ply support surface of the ply carrier using the lamination system; (3) conveying the ply carrier from the lamination system to a transfer system using the carrier transfer device; (4) removing the ply carrier from the carrier transfer device and applying the at least one composite ply to at least a portion of a forming surface of a forming tool using the transfer system; and (5) forming the at least one composite ply over the at least a portion of the forming surface of the forming tool using a forming system.

Other examples of the disclosed system and method will become apparent from the following detailed description, the accompanying drawings, and the appended claims.

DETAILED DESCRIPTION

Figure 1:
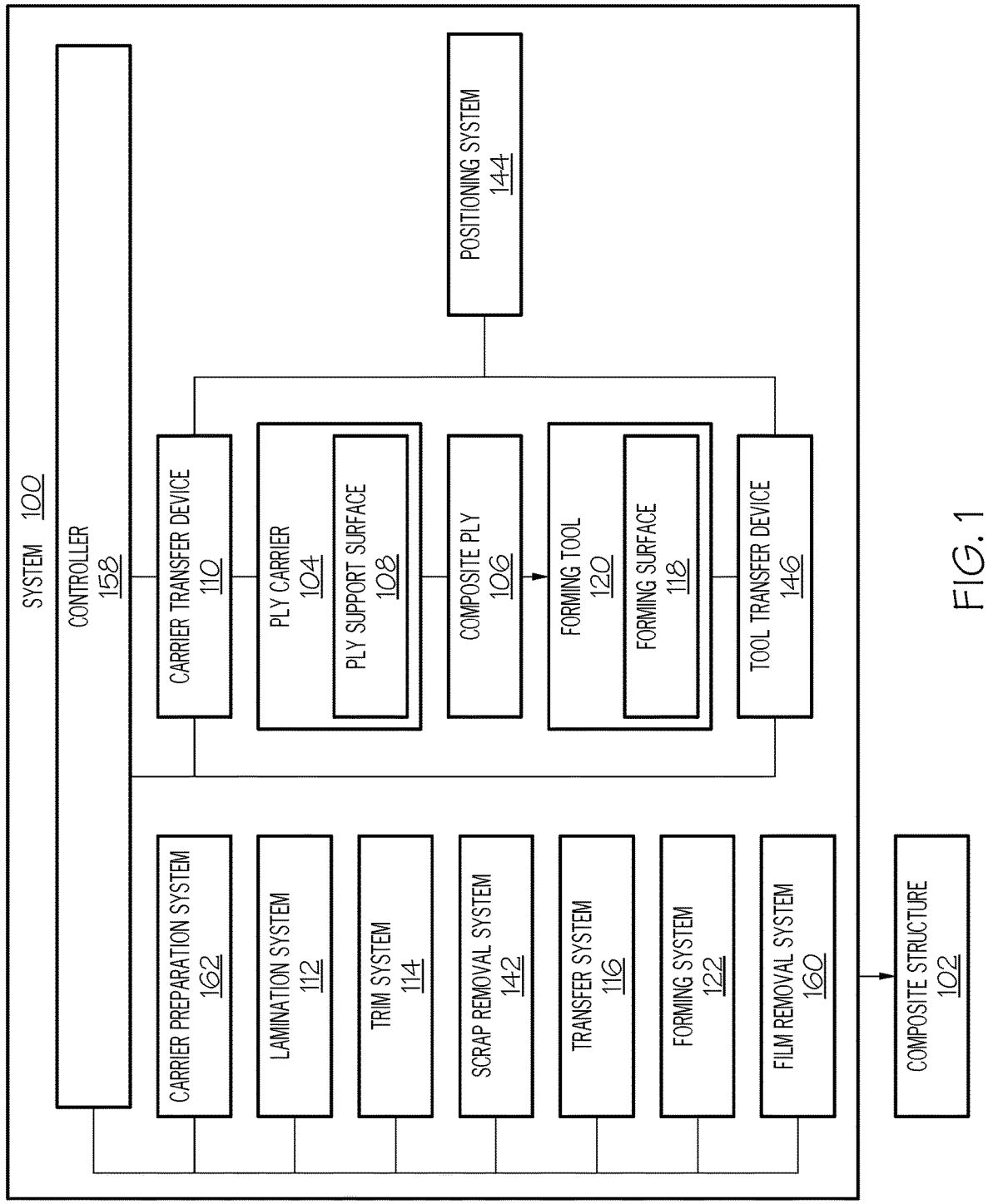
FIG. 1 is a schematic, block diagram of an example of a system for fabricating a composite structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The present disclosure recognizes that conventional automated processes that lay charges (e.g., all layers of CFRP) flat with automated equipment, followed by automated forming may suffer from tow-related issues. As an example, during the forming operation, the fibers may distort causing structural wrinkles and knockdowns in strength. Such knockdowns may result in adding more material to account for structural knockdown. As a result, additional inspection may be required, heavier and less structurally efficient structure may be produced, and additional cost may be incurred. As another example, lamination and forming cycle times in conventional approaches are commonly different, resulting in lamination and forming be performed in series. Such non-synchronist cycle times and serial processing may result in queueing areas between processes and less parallel processing.

Referring generally to FIGS. 1-14, by way of examples, the present disclosure is directed to a system for fabricating a composite structure (referred to herein as "system" 100), a method of fabricating a composite structure (referred to herein as "method" 1000) and a composite structure 102 fabricated using the system 100 or according to the method 1000.

Examples of the system 100 and method 1000 enable automated fabrication of the composite structure 102 and, more particularly, automated fabrication of at least one composite ply 106 and formation of at least one composite ply 106 over a forming tool 120 for manufacture of the composite structure 102. Automation of the fabrication process can provide a reduction in processing time, a reduction in labor and costs, and/or a reduction of process variations (e.g., human error) that may lead to undesired inconsistencies in the finished composite structure as compared to conventional composite fabrication. The system 100 and method 1000 also enable ply-by-ply application and formation of the composite material to fabricate the composite structure 102. Ply-by-ply formation facilitates fabrication of large composite structures, thick composite structures and/or composite structures with complex shapes. Ply-by-ply formation can also provide a reduction in buckling or wrinkling of plies within the composite structure as compared to conventional composite fabrication. Ply-by-ply formation, as disclosed herein, can also provide more structurally efficient (e.g., reduction or elimination of wrinkles) composite structure. Ply-by-ply formation, as disclosed herein, can also provide increased efficiency, as production is scaled for higher rates, by utilizing synchronized parallel processing, which is more efficient in terms of weight, recurring costs and non-recurring costs.

Generally, a composite ply includes a single ply (e.g., one layer of thickness) of composite material. The composite material may take the form of any one of various suitable types of composite material having any one of various ply angles. In one or more examples, the composite ply 106 is formed by laminating multiple courses of unidirectional composite tape, which is pre-impregnated with a resin matrix. Throughout the present disclosure, the phrase "the composite ply" refers to at least one ply of composite material, unless explicitly stated otherwise. The composite ply 106 may also be referred to as a composite patch or a composite charge.

The system 100 includes a plurality of sub-systems that facilitate and correspond to different fabrication operations associated with the manufacture of the composite structure 102. The sub-systems of the system 100 are interlinked and cooperate to automate at least a portion of the fabrication process. Throughout the present disclosure, the sub-systems of the disclosed system 100 may be referred to as "systems" themselves or stations in which one or more fabrication operations occur.

The examples of the system 100 and method 1000 described herein utilize the plurality of semi-automated or automated sub-systems to perform ply-by-ply formation and compaction of individual composite plies 106 on the forming tool 120. Ply-by-ply formation refers to the laydown of composite plies 106 on the forming tool 120 in a predetermined sequence and/or predetermined ply angle, and the composite plies 106 are compacted onto the forming tool 120 individually after each composite ply 106 is laid down, or after more than one composite ply 106 had been laid down.

Referring to FIGS. 1-4, which schematically illustrate examples of the disclosed system 100. In one or more examples, the system 100 includes a lamination system 112 (e.g., laminating sub-system or station), a transfer system 116 (e.g., transfer sub-system or station) and a forming system 122 (e.g., forming sub-system or station). In one or more examples, the system 100 also includes a trim system 114 (e.g., trim sub-system or station) and a scrap removal system 142 (e.g., a scrap removal sub-system of station). In one or more examples, the system 100 further includes a film removal system 160 (e.g., film removal sub-system or station). In one or more examples, the system 100 additionally includes a carrier preparation system 162 (e.g., carrier preparation sub-system or station). In one or more examples, the system 100 also includes a positioning system 144 (e.g., positioning sub-system).

The system 100 includes a ply carrier 104. The ply carrier 104 receives the composite ply 106 thereon. For example, the ply carrier 104 includes a ply support surface 108. The ply support surface 108 is configured to support the composite ply 106. Generally, the ply carrier 104 is movable relative to an individual sub-system or station of the system 100. Once at least one composite ply 106 is formed on the ply carrier 104, the ply carrier 104 facilitates sequential conveyance of the composite ply 106 to the individual sub-systems or stations of the system 100.

In one or more examples, the system 100 includes a carrier transfer device 110. The carrier transfer device 110 is configured to convey the ply carrier 104. For example, the carrier transfer device 110 includes, or takes the form of, a mobile platform that supports the ply carrier 104 and moves the ply carrier 104 between the sub-systems of the system 100 that implement composite ply fabrication operations of the composite manufacturing process.

In one or more examples, the system 100 includes a tool transfer device 146. The tool transfer device 146 is configured to convey the forming tool 120. For example, the tool transfer device 146 includes, or takes the form of, a mobile platform that supports the forming tool 120 and moves the forming tool 120 between the sub-systems of the system 100 that implement composite structure fabrication operations of the composite manufacturing process.

Figure 5:
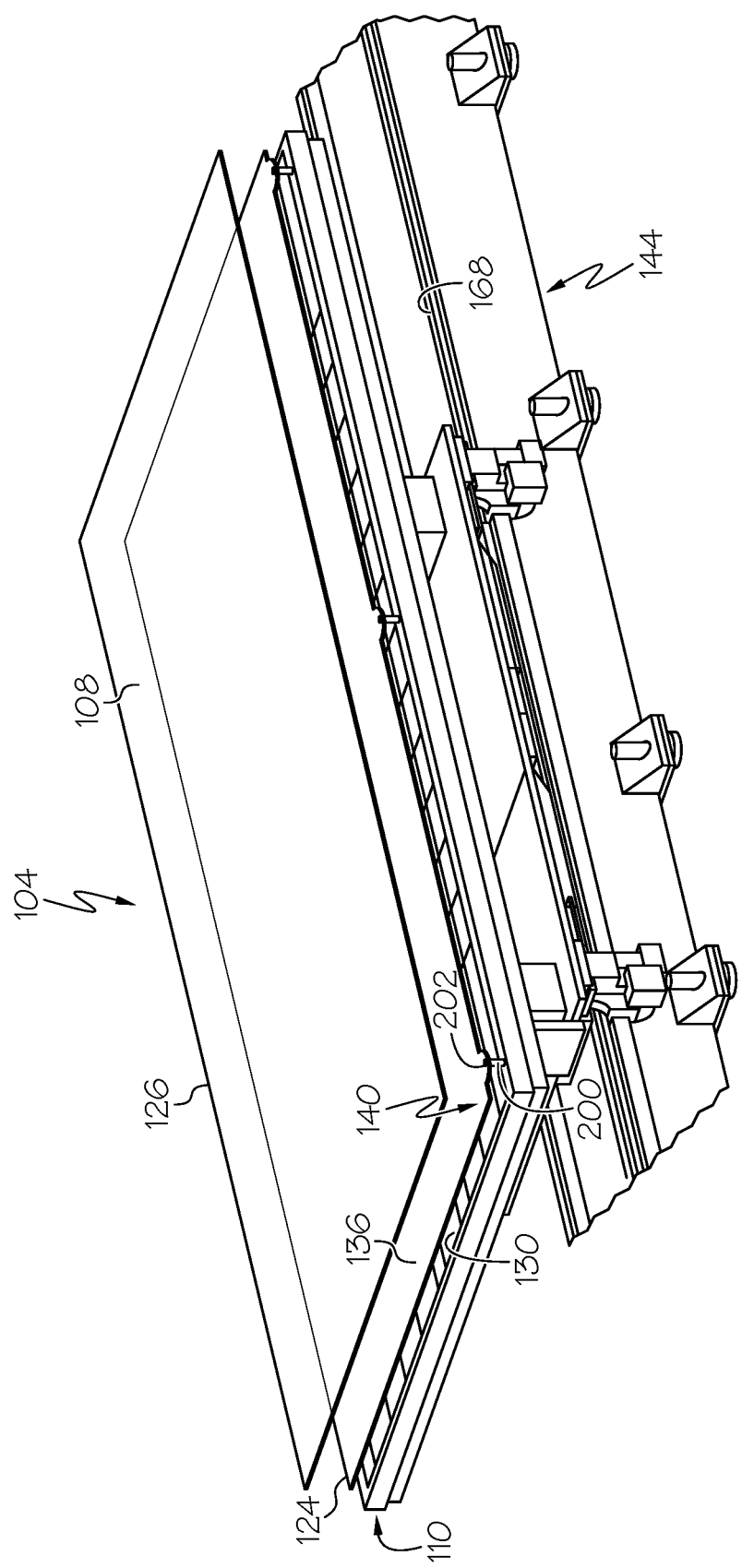
FIG. 5 is a schematic, perspective view of an example of a ply carrier and a carrier transfer device of the system for fabricating the composite structure.

Referring now to FIG. 5, which schematically illustrates an example of the ply carrier 104 and the carrier transfer device 110. In one or more examples, the ply carrier 104 includes a base plate 124 and a film 126 that is positioned on the base plate 124. In these examples, the film 126 forms the ply support surface 108. In other examples, the ply carrier 104 may not include the film 126. In these examples, the base plate 124 forms the ply support surface 108.

The base plate 124 provides a support structure for fabrication of the composite ply 106. Generally, the base plate 124 is relatively thin and substantially planar or at least has a substantially planar surface to which the film 126 is coupled or that forms the ply support surface 108. In one or more examples, the base plate 124 is made of a flexible material. In one or more examples, the base plate 124 is made of a resilient material. The base plate 124 facilitates transfer and application of the composite ply 106 to the forming tool 120. The base plate 124 is capable of deforming during application (e.g., stamping) of the composite ply 106 to the forming tool 120 and then returning to its original (e.g., substantially planar) shape. Thus, in production, the base plate 124 is reusable for fabrication and application of a number of composite plies 106, thereby reducing equipment and material costs.

In one or more examples, the base plate 124 is made of a metallic material. As an example, the base plate 124 includes, or takes the form of, a metal sheet, such as a sheet of spring steel. In other examples, the base plate 124 may be made of any other suitable material. In one or more examples, the base plate 124 is made of a material that is sufficiently flexible and resilient to enable contouring of the base plate 124 during application of the composite ply 106 to the forming tool 120.

The film 126 provides a contact surface onto which the composite ply 106 is fabricated. Generally, the film 126 is a relatively thin and flexible sheet of material that covers the base plate 124. The film 126 facilities fabrication of the composite ply 106 and application and formation of the composite ply 106 over the forming tool 120. The film 126 provides a work surface to which the composite ply 106 is formed and temporarily held. The film 126 is capable of deforming during application and formation of the composite ply 106 over the forming tool 120. The film 126 is also capable of being removed from the composite ply 106, after formation of the composite ply 106 over the forming tool 120.

Generally, the film 126 has surface properties that enable the composite ply 106 to temporarily adhere to the film 126 via the resin matrix, thereby retaining the composite ply 106 on the ply support surface 108 but enabling the film 126 to be removed from the composite ply 106 after formation. The film 126 provides protection to the composite ply 106 during application of the composite ply 106 to the forming tool 120 and formation of the composite ply 106 over the forming tool 120. The film 126 also provides stability to the composite ply 106.

In one or more examples, the film 126 is made of a plastic material, such as a thermoplastic material. As an example, the film 126 includes, or takes the form of, a sheet of polyethylene, such as a sheet of yellow poly. In one or more examples, the film 126 is made of fluorinated ethylene propylene (FEP) or ethylene tetrafluoroethylene (ETFE). In one or more examples, the film 126 is a release film, such as a polyester release film, with high modulus and low elongation that provide a substantially flat contact surface that is compatible with most resin systems and adhesives. In one or more examples, the film 126 is made of a metallic foil. In other examples, the film 126 may be made of any other suitable material.

The film 126 is releasably coupled to the base plate 124 prior to fabrication of the composite ply 106. The film 126 remains coupled to the base plate 124 during fabrication of the composite ply 106, during transfer of the composite ply 106 and during application of the composite ply 106 to the forming tool 120. The film 126 is released from the base plate 124 after application of the composite ply 106 to the forming tool 120. The film 126 may be releasably coupled to the base plate 124 via any one of various suitable techniques.

Referring to FIGS. 5-8, which schematically illustrate examples of the carrier transfer device 110 and the ply carrier 104. In one or more examples, the film 126 is releasably coupled to the base plate 124 via vacuum retention. In these examples, the base plate 124 facilitates vacuum to move through the ply carrier 104 and engage the film 126. For example, the carrier transfer device 110 includes a vacuum table 130 (e.g., FIGS. 5-7) and the base plate 124 includes a plurality of vacuum apertures 128 (e.g., FIG. 8). The plurality of vacuum apertures 128 allow for vacuum to move through the base plate 124. With the ply carrier 104 positioned on the carrier transfer device 110, the vacuum table 130 is in fluid communication with the plurality of vacuum apertures 128. The vacuum table 130 includes a perforated top and a vacuum chamber that is in fluid communication with a vacuum source. The vacuum table 130 is configured to apply a retention vacuum to the plurality of vacuum apertures 128 of the base plate 124 to temporarily hold and retain the film 126 on the base plate 124.

In one or more examples, the carrier transfer device 110 includes parts and components (e.g., vacuum source, vacuum ports, plumbing, actuators, valves and the like) that enable production, application and selective control of the retention vacuum. The vacuum source (e.g., a vacuum pump) may be component of the system 100 or a part of a sub-system (e.g., the positioning system 144) of the system 100. Alternatively, the vacuum source may be an integral component of the carrier transfer device 110. In production, the retention vacuum is provided by the vacuum table 130, which is then applied to the film 126 through the plurality of vacuum apertures 128 formed in the base plate 124.

In one or more examples, the vacuum table 130 includes a plurality of vacuum zones 204. Each one of the plurality of vacuum zones 204 is controllable to selectively apply and remove vacuum to a corresponding set of vacuum apertures 128 (FIG. 10) positioned over the respective vacuum zone 204. For example, each one of the plurality of vacuum zones 204 includes a valve 206 that is selectively open or closed to control application of vacuum to the respective vacuum zone 204. The vacuum zones 204 enable the vacuum table 130 to apply vacuum where needed to retain the film 126 on the base plate 124. The vacuum zones 204 also enable the vacuum table 130 to cease application of vacuum to select areas of the base plate 124, such as during removal of scrap remnants of the composite ply 106 after a trimming operation. The vacuum table 130 and the plurality of vacuum apertures 128 formed in the base plate 124 are arranged to adequately distribute a sufficient retention vacuum to retain the film 126 on the surface of the base plate 124 during movement of the ply carrier 104 through the system 100.

In one or more examples, the vacuum table 130 includes a plurality of lip seals 208. Each lip seal 208 is located between adjacent ones of the plurality of vacuum zones 204. For example, the lip seals 208 form the peripheral boundaries of the vacuum zones 204 and isolate each one of the vacuum zones 204 from an adjacent one of the vacuum zones 204. The plurality of lip seals 208 provide a sealing interface with the base plate 124 without affecting the surface flatness of the vacuum table 130.

Figure 6:
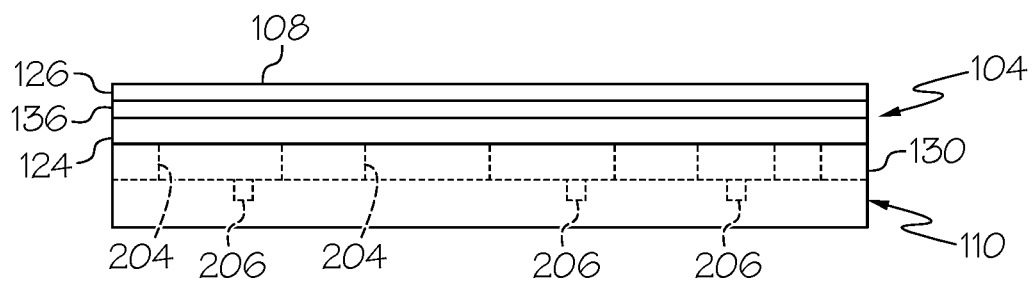
FIG. 6 is a schematic, elevational view of an example of the ply carrier and the carrier transfer device of the system for fabricating the composite structure.

As illustrated in FIGS. 5 and 6, in one or more examples, the ply carrier 104 also includes a liner 136. The liner 136 is coupled to the base plate 124. Generally, the liner 136 is a relatively thin sheet of material that covers the base plate 124. For example, the liner 136 is coupled to and covers the surface of the base plate 124 and is located between the base plate 124 and the film 126. The liner 136 may be coupled to the base plate 124 in any one of various techniques, such as via adhesive bonding, mechanical fasteners and the like. In these examples, the film 126 is positioned on the liner 136 and the liner 136 provides a contact surface onto which the film 126 is applied.

In one or more examples, the liner 136 is permeable by the retention vacuum. The liner 136 facilitates distribution of the retention vacuum from the plurality of vacuum apertures 128 to the film 126. The liner 136 also prevents the film 126 from dimpling or wrinkling at the plurality of vacuum apertures 128 in response to application of the retention vacuum.

In one or more examples, the liner 136 is made of a porous plastic material, such as a porous thermoplastic material. As an example, the liner 136 includes, or takes the form of, a sheet of polypropylene. As another example, the liner 136 includes, or takes the form of, a sheet of high-density polyethylene. As another example, the liner 136 is a sheet of VYON® porous polymer fluidizing media, commercially available from Porvair Filtration Group Inc. In other examples, the liner 136 may be made of any other suitable material, such as a material that is flexible, that permits vacuum to pass though itself and that can serve as a cutting surface.

Figure 7:
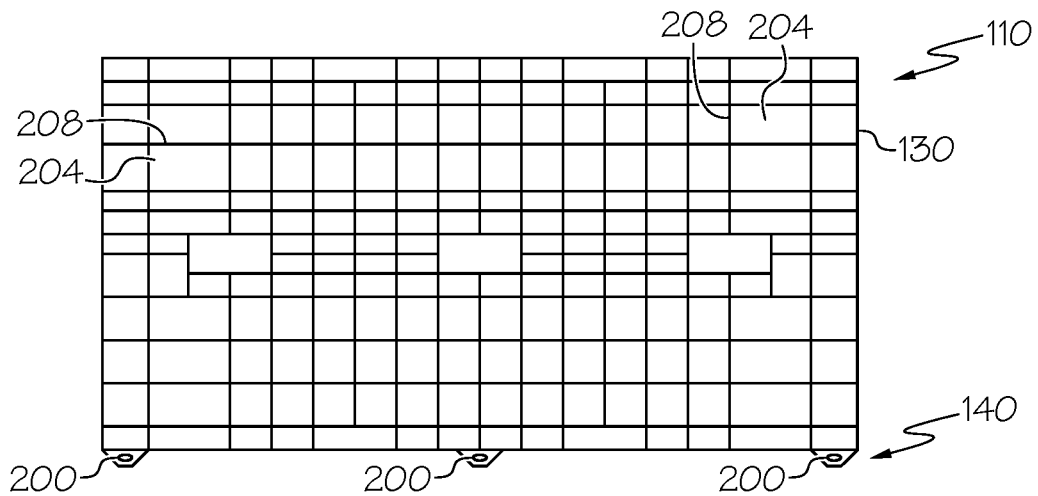
FIG. 7 is a schematic, plan view of an example of a vacuum table of the carrier transfer device.
Figure 8:
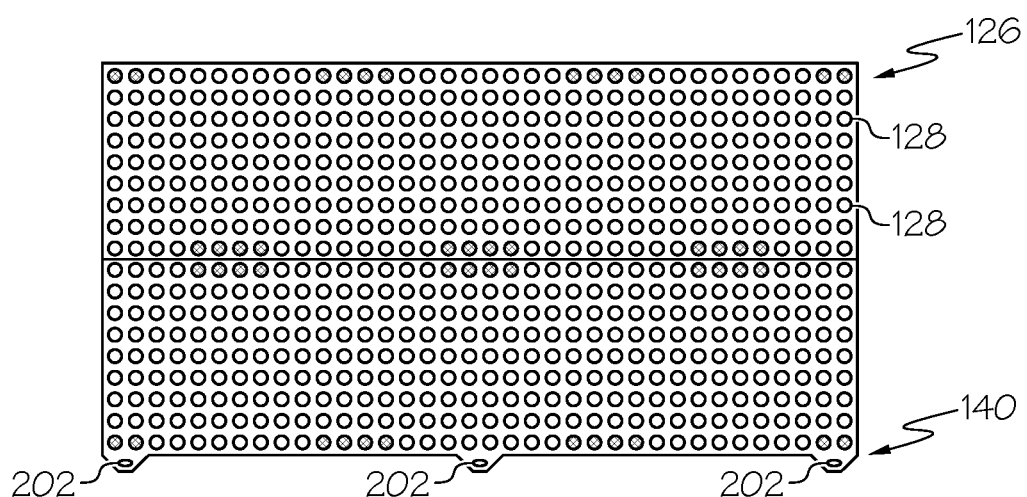
FIG. 8 is a schematic, plan view of an example of a base plate of the ply carrier.

Referring to FIGS. 5, 7 and 8, in one or more examples, the system 100 includes an indexing structure 140. The indexing structure 140 is configured to operatively locate the ply carrier 104 at a specified location on the carrier transfer device 110. In one or more examples, the indexing structure 140 includes mating components located on the carrier transfer device 110 and the base plate 124 of the ply carrier 104. For example, the carrier transfer device 110 includes at least one indexing pin 200 (e.g., at least two indexing pins 200) and the base plate 124 includes at least one indexing aperture 202 (e.g., at least two indexing apertures 202) that corresponds to the indexing pin 200. The indexing pin 200 and the indexing aperture 202 cooperate to position the ply carrier 104 on the carrier transfer device 110.

Figure 2:
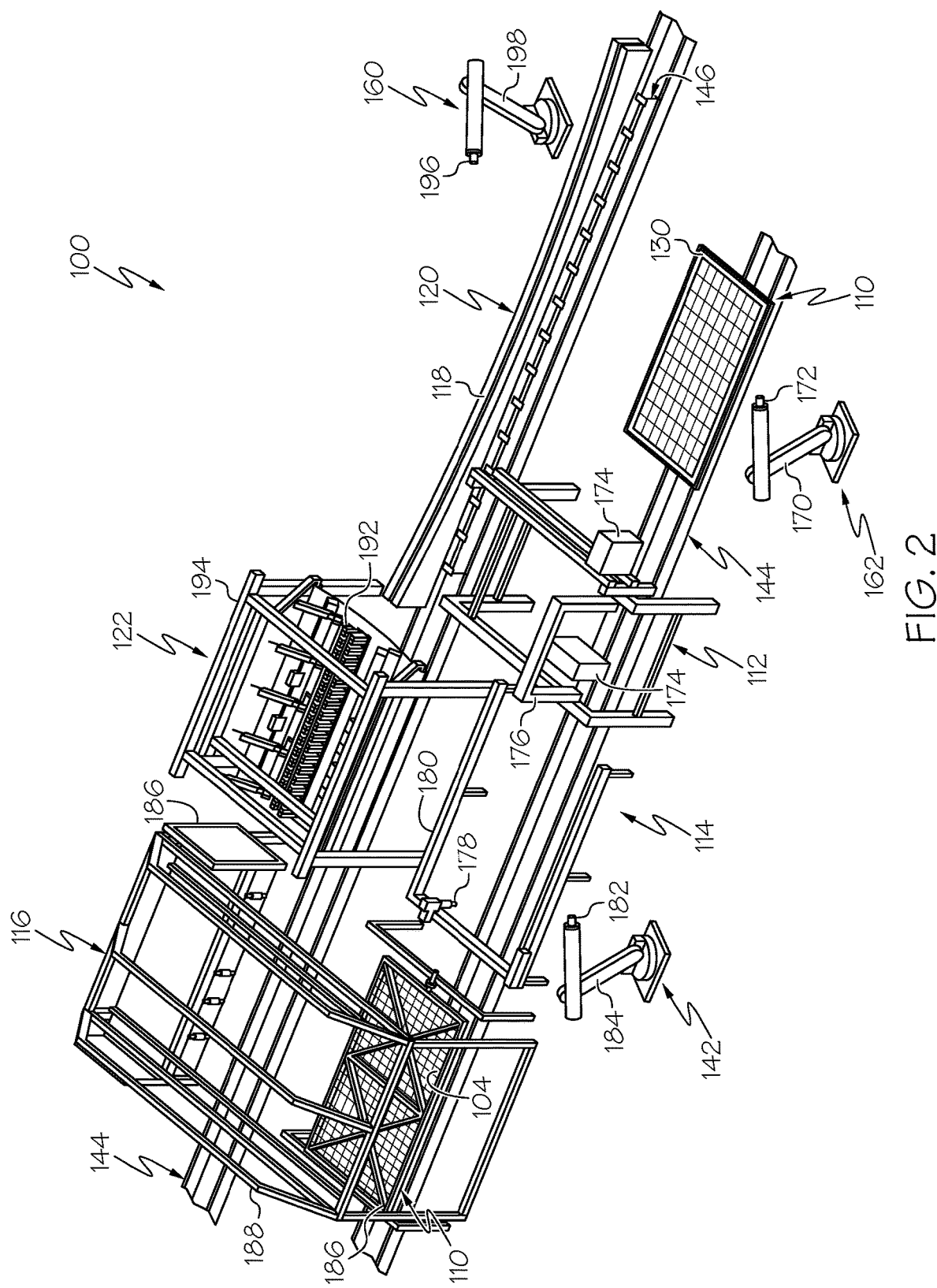
FIG. 2 is a schematic illustration of an example of the system for fabricating the composite structure.
Figure 3:
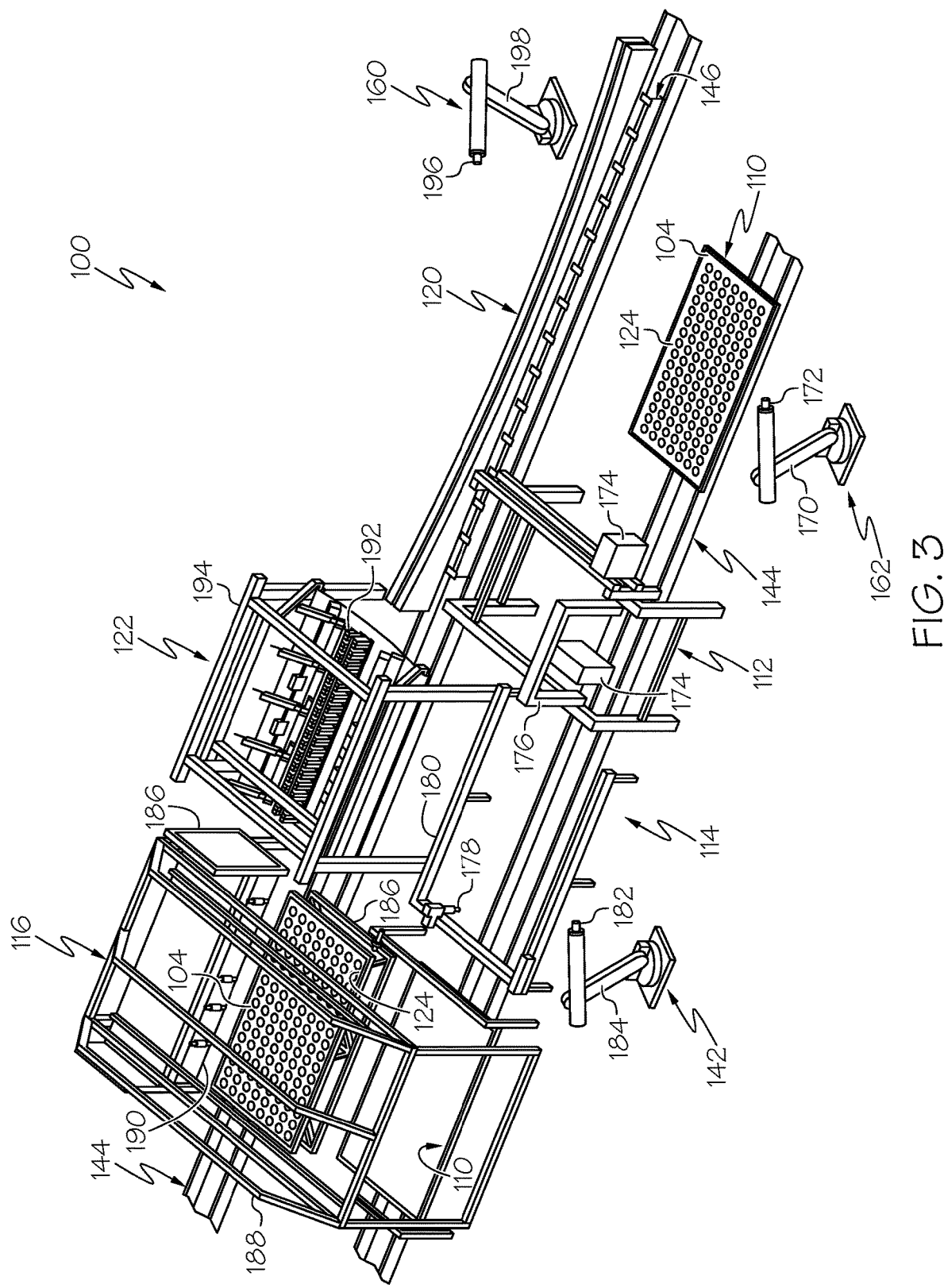
FIG. 3 is a schematic illustration of an example of the system for fabricating the composite structure.
Figure 4:
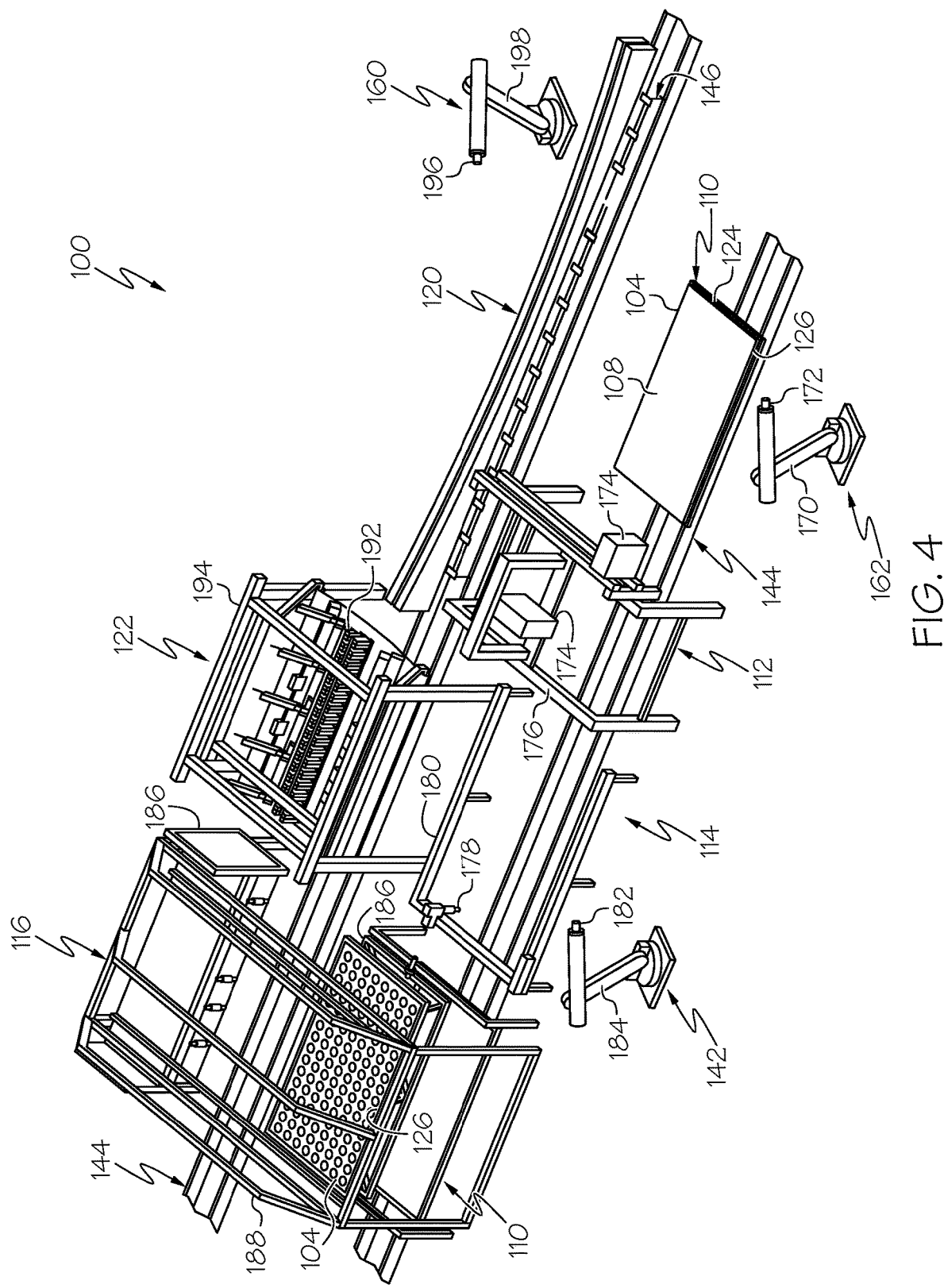
FIG. 4 is a schematic illustration of an example of the system for fabricating the composite structure.

Referring now to FIGS. 2-4, the sub-systems of the system 100 are generally arranged in operational sequence with each other within a manufacturing environment. In one or more examples, the lamination system 112 is in sequential relation to the carrier preparation system 162. In one or more examples, the trim system 114 is in sequential relation to the lamination system 112. In one or more examples, the scrap removal system 142 is in sequential relation to the trim system 114. In one or more examples, the transfer system 116 is in sequential relation to the scrap removal system 142. In one or more examples, the forming system 122 is in sequential relation to the transfer system 116. In one or more examples, the film removal system 160 is in sequential relation to the forming system 122.

It should be recognized that not every sub-system is required, or certain sub-systems may not be utilized in every implementation of the disclosed system 100. For example, in certain implementations, the carrier preparation system 162, the trim system 114 and/or the scrap removal system 142 may not be utilized in fabrication of the composite structure 102 and, thus, may not be included as a sub-system within the system 100. As such, in one or more examples, the transfer system 116 is in sequential relation to the lamination system 112.

It should also be recognized that one or more of the sub-systems may be co-located or otherwise share an operational station of the system 100. As an example, the trim system 114 and the scrap removal system 142 may share a location in the manufacturing environment or be part of the same operational station of the system 100. As such, movement of the ply carrier 104 from the trim system 114 to the scrap removal system 142 (e.g., between a trimming operation and a scrap removing operation) may not be required, thereby reducing cycle time. As another example, the forming system 122 and the film removal system 160 may share a location in the manufacturing environment or be part of the same operation station of the system 100. As such, movement of the forming tool 120 from the forming system 122 to the film removal system 160 (e.g., between a forming operation and a film removing operation) may not be required, thereby reducing cycle time.

In one or more examples, the carrier transfer device 110 conveys the ply carrier 104 to the carrier preparation system 162 for preparation of the ply carrier 104. In one or more examples, the carrier transfer device 110 coveys the ply carrier 104 from the carrier preparation system 162 to the lamination system 112 for application of the composite ply 106 to the ply carrier 104. In one or more examples, the carrier transfer device 110 conveys the ply carrier 104, and the composite ply 106 supported on the ply carrier 104, from the lamination system 112 to the trim system 114 for cutting the composite ply 106. In one or more examples, the carrier transfer device 110 conveys the ply carrier 104, and the composite ply 106 supported on the ply carrier 104, from the trim system 114 to the scrap removal system 142 for removal of remnants (e.g., scrap composite material) from the ply carrier 104 after cutting. In one or more examples, the carrier transfer device 110 conveys the ply carrier 104, and the composite ply 106 supported on the ply carrier 104, from the trim system 114 to the transfer system 116 for application of the composite ply 106 to the forming tool 120.

Alternatively, in one or more examples, such as when the trimming operation is not performed, the carrier transfer device 110 conveys the ply carrier 104, and the composite ply 106 supported on the ply carrier 104, from the lamination system 112 directly to the transfer system 116.

In one or more examples, the tool transfer device 146 conveys the forming tool 120 to the transfer system 116 for application of the composite ply 106 to the forming tool 120. In one or more examples, the tool transfer device 146 conveys the forming tool 120, and the composite ply 106 applied to the forming tool 120, from the transfer system 116 to the forming system 122 for formation and compaction of the composite ply 106 over the forming tool 120. In one or more examples, the tool transfer device 146 conveys the forming tool 120, and the composite ply 106 formed over the forming tool 120, from the forming system 122 to the film removal system 160 for removal of the film 126 from the composite ply 106.

The positioning system 144 may be any suitable system that guides the carrier transfer device 110 and the tool transfer device 146 along a predetermined workflow or path. In one or more examples, the positioning system 144 is configured to selectively position the carrier transfer device 110 relative to individual sub-systems or workstations of the system 100 (e.g., the carrier preparation system 162, the lamination system 112, the trim system 114, the scrap removal system 142 and the transfer system 116). In one or more examples, the positioning system 144 is configured to selectively position the tool transfer device 146 relative to individual sub-systems or workstations of the system 100 (e.g., the transfer system 116, the forming system 122 and the film removal system 160).

In one or more examples, as illustrated in FIGS. 2-5, the positioning system 144 includes a rail assembly 168 or similar conveyor assembly that physically guides the carrier transfer device 110 and the tool transfer device 146 through the system 100. In these examples, the carrier transfer device 110 and the tool transfer device 146 may include a cart, a pallet, a carriage, or similar platform that is configured to travel along the rail assembly 168. As such, in these examples, the positioning system 144, the carrier transfer device 110 and the tool transfer device 146 include cooperating parts and components (e.g., drive motors, tracks, actuators, gears, wheels, sensors and the like) that enable selectively controlled transportation of the carrier transfer device 110 and the tool transfer device 146 along the positioning system 144.

In one or more examples, the rail assembly 168 includes parts and components (e.g., rack and pinion assembly, roller tables, gauges and the like) that precisely control movement of the carrier transfer device 110 and the tool transfer device 146 through the system 100. As such, the positioning system 144 may be configured to index the carrier transfer device 110 and the tool transfer device 146 at a plurality of predetermined locations relative to respective sub-systems or workstations of the system 100.

Figure 9:
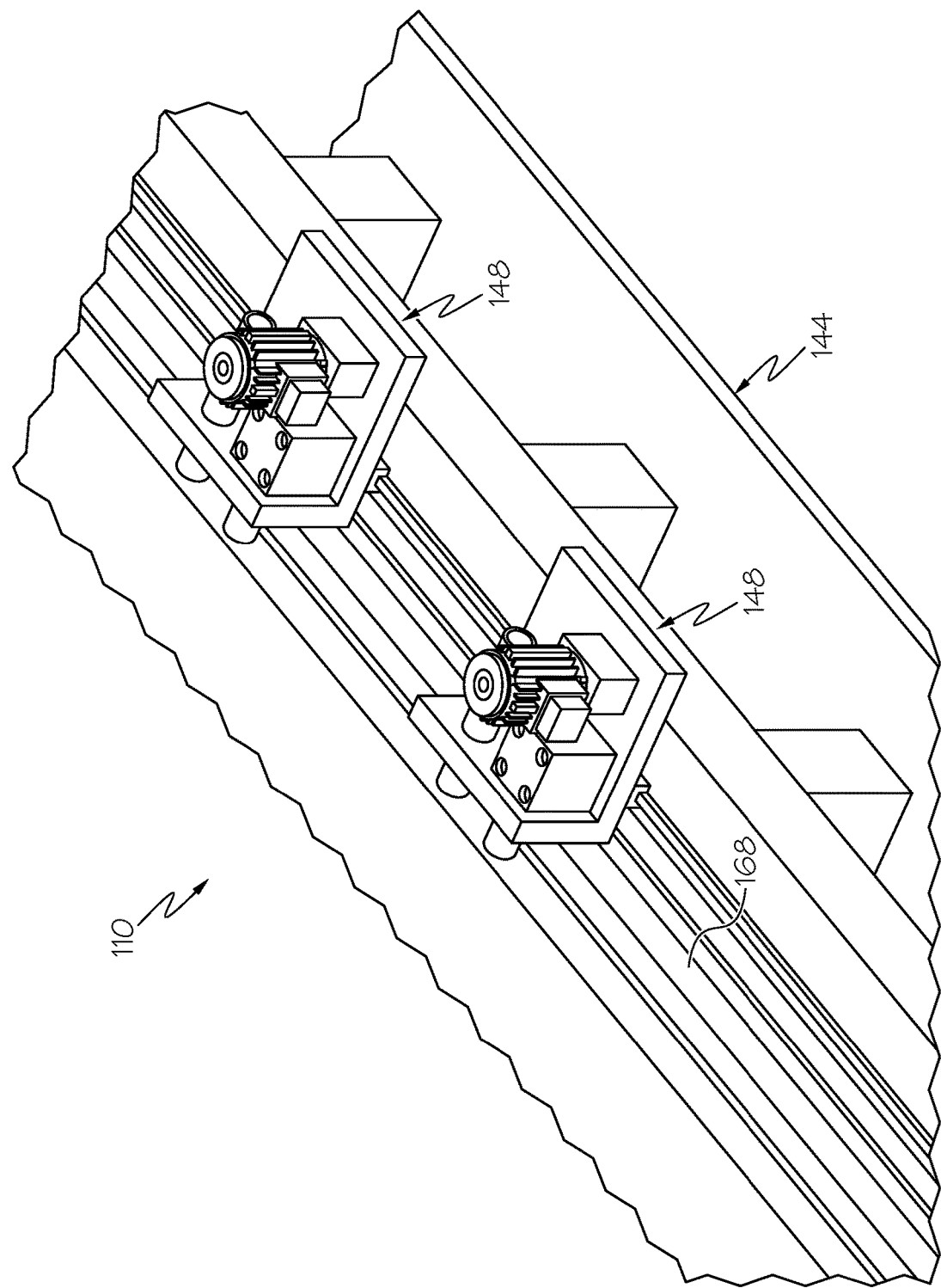
FIG. 9 is a schematic illustration of an example of a portion of a positioning system and an indexing device of the system for fabricating the composite structure.

Referring to FIG. 9, in one or more examples, the system 100 includes an indexing device 148. For example, the system 100 may include a plurality of indexing devices 148 located along the positioning system 144. As an example, at least one indexing device 148 is located along the rail assembly 168 at each one of the sub-systems or workstations of the system 100. In one or more examples, the indexing device 148 is configured to operatively locate the carrier transfer device 110 at a plurality of specified locations, for example, relative to at least one of the carrier preparation system 162, the lamination system 112, the trim system 114, the scrap removal system 142 and the transfer system 116. In one or more examples, the indexing device 148 is configured to operatively locate the tool transfer device 146 at a plurality of specified locations, for example, relative to at least one of the transfer system 116, the forming system 122 and the film removal system 160.

In an example, the indexing device 148 includes parts and components (e.g., actuators, indexing pins, sensors and the like) that enable the indexing device 148 to automatically detect and index the carrier transfer device 110 and the tool transfer device 146.

Figure 10:
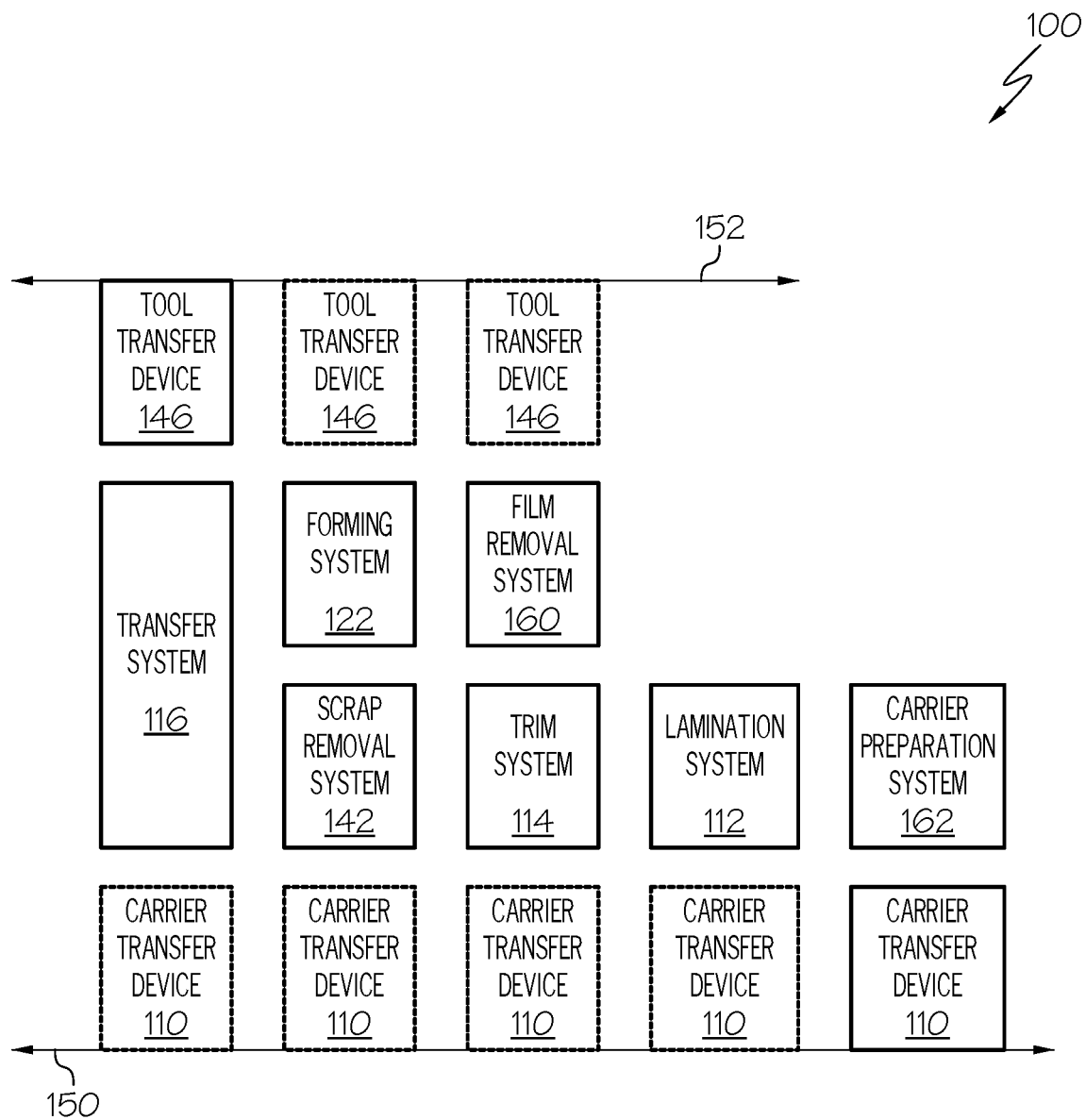
FIG. 10 is a schematic, flow diagram of an example of the system for fabricating the composite structure.

Referring to FIG. 10, in one or more examples, the positioning system 144 includes a linear carrier guide 150. The linear carrier guide 150 is configured to operatively translate the carrier transfer device 110 through the sub-systems or workstations of the system 100, for example, along a linear workflow path. For example, a portion of rail assembly 168 dedicated to conveying the carrier transfer device 110 is a linear segment with discrete terminal ends. In these examples, the positioning system 144 is configured to selectively move the carrier transfer device 110 along an X-axis.

In one or more examples, in operation, the carrier transfer device 110 moves in a first direction along the linear carrier guide 150 from the carrier preparation system 162 to the lamination system 112. The carrier transfer device 110 then moves in the first direction along the linear carrier guide 150 from the lamination system 112 to the trim system 114 and the scrap removal system 142. The carrier transfer device 110 then moves in the first direction along the linear carrier guide 150 from the scrap removal system 142 to the transfer system 116. Alternatively, as described above, the carrier transfer device 110 moves in the first direction along the linear carrier guide 150 from the lamination system 112 directly to the transfer system 116, for example, when trim system 114 and the scrap removal system 142 are not utilized or included in the system 100. After application of the composite ply 106 to the forming tool 120 and following return of the ply carrier 104 to the carrier transfer device 110, the carrier transfer device 110 then moves in a second direction, opposite the first direction, along the linear carrier guide 150 from the transfer system 116 back to the carrier preparation system 162 through the scrap removal system 142, the trim system 114 and the lamination system 112, where the process repeats for fabrication and transfer of a subsequent composite ply 106.

In one or more examples, the positioning system 144 includes a linear tool guide 152. The linear tool guide 152 is configured to operatively translate the tool transfer device 146 through the sub-systems or workstations of the system 100, for example, along a linear workflow path. For example, a portion of rail assembly 168 dedicated to conveying the tool transfer device 146 is a linear segment with discrete terminal ends. In these examples, the positioning system 144 is configured to selectively move the tool transfer device 146 along an X-axis.

In one or more examples, in operation, the tool transfer device 146 moves in a first direction along the linear tool guide 152 to the transfer system 116. The tool transfer device 146 then moves in the first direction along the linear tool guide 152 from the transfer system 116 to the forming system 122. The tool transfer device 146 then moves in the first direction along the linear tool guide 152 from the forming system 122 to the film removal system 160. The tool transfer device 146 then moves in a second direction, opposite the first direction, along the linear tool guide 152 from film removal system 160 back to the transfer system 116 through the forming system 122, where the process repeats for application and formation of a subsequent composite ply 106.

Figure 11:
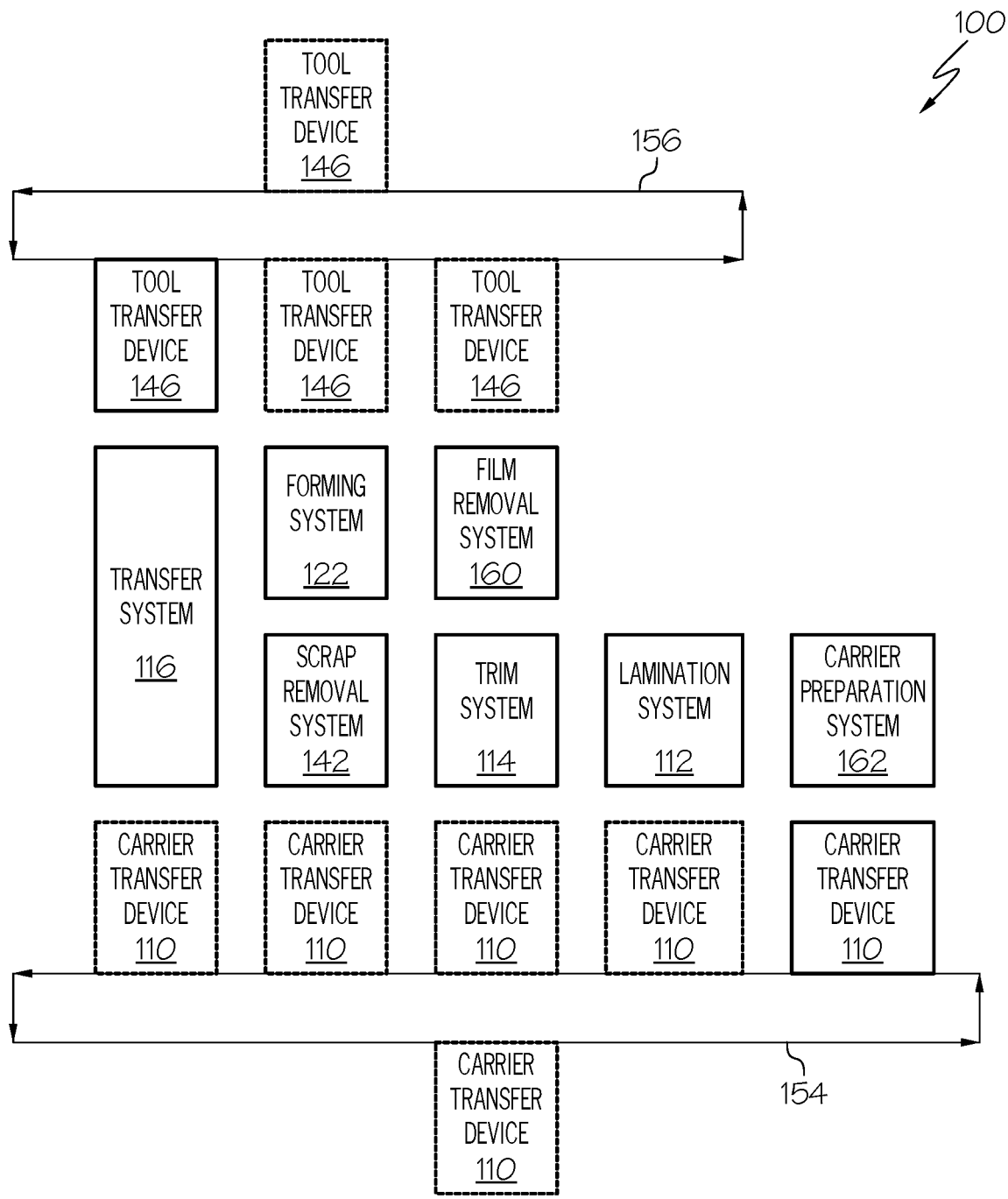
FIG. 11 is a schematic, flow diagram of another example of the system for fabricating the composite structure.

Referring to FIG. 11, in one or more examples, the positioning system 144 includes a closed-loop carrier guide 154. The closed-loop carrier guide 154 is configured to operatively circulate the carrier transfer device 110 through the sub-systems or workstations of the system 100, for example, along a continuous workflow path. For example, a portion of rail assembly 168 dedicated to conveying the carrier transfer device 110 is a continuous loop. In these examples, the positioning system 144 is configured to selectively move the carrier transfer device 110 along an X-axis and a Y-axis.

In one or more examples, in operation, the carrier transfer device 110 moves in a first direction along the closed-loop carrier guide 154 from the carrier preparation system 162 to the lamination system 112. The carrier transfer device 110 then moves in the first direction along the closed-loop carrier guide 154 from the lamination system 112 to the trim system 114 and the scrap removal system 142. The carrier transfer device 110 then moves in the first direction along the closed-loop carrier guide 154 from the scrap removal system 142 to the transfer system 116. Alternatively, as described above, the carrier transfer device 110 moves in the first direction along the closed-loop carrier guide 154 from the lamination system 112 directly to the transfer system 116, for example, when trim system 114 and the scrap removal system 142 are not utilized or included in the system 100. After application of the composite ply 106 to the forming tool 120 and following return of the ply carrier 104 to the carrier transfer device 110, the carrier transfer device 110 then moves in the first direction along the closed-loop carrier guide 154 from the transfer system 116 back to the carrier preparation system 162, where the process repeats for fabrication and transfer of a subsequent composite ply 106.

In one or more examples, the positioning system 144 includes a closed-loop tool guide 156. The closed-loop tool guide 156 is configured to operatively circulate the tool transfer device 146 through the sub-systems or workstations of the system 100, for example, along a continuous workflow path. For example, a portion of rail assembly 168 dedicated to conveying the tool transfer device 146 is a continuous loop. In these examples, the positioning system 144 is configured to selectively move the tool transfer device 146 along an X-axis and a Y-axis.

In one or more examples, in operation, the tool transfer device 146 moves in a first direction along the closed-loop tool guide 156 to the transfer system 116. The tool transfer device 146 then moves in the first direction along the closed-loop tool guide 156 from the transfer system 116 to the forming system 122. The tool transfer device 146 then moves in the first direction along the closed-loop tool guide 156 from the forming system 122 to the film removal system 160. The tool transfer device 146 then moves in the first direction along the closed-loop tool guide 156 from film removal system 160 back to the transfer system 116, where the process repeats for application and formation of a subsequent composite ply 106.

In either of the example configurations of the positioning system 144 described above (e.g., utilizing a translating workflow or a continuous workflow), the positioning system 144 includes access areas that enable on-loading and off-loading of the carrier transfer device 110 and the tool transfer device 146.

In one or more examples, the system 100 utilizes a plurality of carrier transfer devices 110. Each one of the plurality of carrier transfer devices 110 conveys a respective one of a plurality of ply carriers 104 through the system 100. Thus, in production, multiple operations can be performed simultaneously on different ones of the plurality of ply carriers 104, thereby reducing cycle time. Similarly, in one or more examples, the system 100 utilizes a plurality of tool transfer devices 146. Each one of the plurality of tool transfer devices 146 conveys a respective one of a plurality of forming tool 120 through the system 100. Thus, in production, multiple operations can be performed simultaneously on different ones of the plurality of forming tools 120, thereby reducing cycle time.

Referring again to FIGS. 2-4, in one or more examples, the carrier preparation system 162 is configured to prepare the ply carrier 104 and, more particularly, the ply support surface 108, to receive the composite ply 106. For example, in production, the carrier transfer device 110 positions the ply carrier 104 relative to the carrier preparation system 162, which automatically applies the film 126 to the base plate 124, or to the liner 136 covering the base plate 124, to prepare the ply support surface 108.

In one or more examples, the carrier preparation system 162 includes at least one preparing device 172. The preparing device 172 is configured to interact with ply carrier 104. The preparing device 172 may be any suitable machine or device capable of manipulating the film 126 and properly positioning the film 126 on the base plate 124, or on the liner 136. In one or more examples, the preparing device 172 includes, or takes the form of, a robotic end effector. The preparing device 172 includes parts and components (e.g., drive motors, actuators, grippers, cutters, rollers, sensors and the like) that enable the preparing device 172 to automatically apply the film 126 to the base plate 124, or the liner 136. As an example, the preparing device 172 is configured to remove the film 126 from a supply roll, cut the film 126 to a predetermined size and shape and apply the film 126.

The preparing device 172 is movable relative to the ply carrier 104. For example, the preparing device 172 operates in a three-dimensional X, Y, Z coordinate system. In one or more examples, the carrier preparation system 162 includes a support platform 170 that is configured to selectively move and position the preparing device 172 relative to the carrier transfer device 110 and, thus, the ply carrier 104. The support platform 170 may be any suitable machine capable of automatically driving and controlling movement of the preparing device 172, such as a robot, a robotic arm, and overhead gantry and the like.

Additionally, the carrier preparation system 162 is configured to automatically position the base plate 124 on the carrier transfer device 110. For example, the preparing device 172 is configured to manipulate the base plate 124 and position the base plate 124 on the carrier transfer device 110 at the proper location using the indexing structure 140.

Alternatively, preparation of the ply carrier 104 may be performed manually or semi-autonomously with manual assistance.

In one or more examples, the lamination system 112 is configured to selectively apply the composite ply 106 to the ply support surface 108 of the ply carrier 104. For example, in production, the carrier transfer device 110 positions the ply carrier 104 relative to the lamination system 112, which automatically fabricates the composite ply 106 on the ply support surface 108 of the ply carrier 104.

In one or more examples, the lamination system 112 include at least one laminating device 174. The laminating device 174 is configured to lay up and laminate the composite ply 106. The laminating device 174 may be any suitable machine or device capable of manipulating a composite material to lay the composite ply 106 on the ply support surface 108. As an example, the laminating device 174 is configured to lay down and laminate multiple courses (e.g., continuous or discontinuous courses) of unidirectional composite tape in an edge-to-edge relationship. The laminating device 174 includes parts and components (e.g., drive motors, actuators, cutters, rollers, tape control modules, sensors and the like) that enable the laminating device 174 to automatically fabricate the composite ply 106. In one example, when the lamination system 112 includes multiple laminating devices 174, each laminating device 174 operates to lay material in one or more particular orientations. As an example, the laminating device 174 is configured to lay, cut, add and compact the composite material (e.g., composite tape) onto the ply support surface 108 or a previously laid composite ply 106.

The laminating device 174 is movable relative to the ply carrier 104. For example, the laminating device 174 operates in the three-dimensional X, Y, Z coordinate system. In these examples, the X-axis may correspond to the length of the composite ply 106, the Y-axis may correspond to the width of the composite ply 106, and the Z-axis extends substantially normal to the X-Y plane. In one or more examples, the lamination system 112 includes a support platform 176 that is configured to selectively move and position the laminating device 174 relative to the carrier transfer device 110 and, thus, the ply carrier 104. The support platform 176 may be any suitable machine capable of automatically driving and controlling movement of the laminating device 174, such as a robot, a robotic arm, and overhead gantry and the like.

In one or more examples, the composite ply 106 includes one layer of thickness (e.g., one ply of composite material). For example, courses of composite tape are laminated on the ply support surface 108 to form one composite ply 106. In one or more examples, the composite ply 106 includes a plurality of layers of thickness (e.g., a plurality of plies of composite material). For example, courses of composite tape are laminated on a previously laid ply to form additional composite plies 106.

The lamination system 112 is configured to lay down the composite ply 106 having any desired fiber orientation, for example, based on the predetermined ply schedule or laydown sequence. The lamination system 112 may be particularly well suited for lay up of a relatively long and narrow composite ply 106 (e.g., relatively long in relation to width), such as used in ply-by-ply fabrication of composite spars and stringers used in the aerospace industry.

In one or more examples, the lamination system 112 fabricates and provides the composite plies 106 as-needed and on-demand, for example, in accordance with a predetermined ply laydown sequence. As such, the need for ply sequencing, sorting and storage of prefabricated plies is eliminated, thereby reducing manual labor and the opportunity for error in performing the ply laydown process. In one or more examples, each composite ply 106 in the ply laydown sequence may be different from each other by at least one parameter, such as, but not limited to, fiber orientation, weave pattern, ply laydown orientation, ply laydown location and overall ply shape.

In one or more examples, the lamination system 112 may include more than one laminating device 174. In these examples, a plurality of laminating devices 174 is configured to concurrently fabricate a plurality of composite plies 106 that can be provided to a plurality of forming tools 120, thereby reducing cycle time.

In one or more examples, the trim system 114 is configured to selectively cut the composite ply 106 into a predetermined shape. For example, in production, the carrier transfer device 110 positions the ply carrier 104 relative to the trim system 114, which automatically cuts the composite ply 106 to the predetermined shape on the ply support surface 108 of the ply carrier 104. The predetermined shape may be based on the type of composite structure 102 being fabricated, the shape or contour of the forming surface 118, the ply laydown sequence, the ply laydown location and the overall ply shape as well as to compensate for transformation from a flat state to a contoured shape upon application to and formation over the forming tool 120.

In one or more examples, the trim system 114 includes at least one cutting device 178. The cutting device 178 is configured to cut the composite ply 106. The cutting device 178 may be any suitable cutter capable of cutting through the composite material of the composite ply 106. As an example, the cutting device 178 includes, or takes the form of, an ultrasonic cutter. In other examples, the cutting device 178 includes, or takes the form of, a blade, a laser cutter or the like. When the ply carrier 104 includes the liner 136, the liner 136 protects the surface of the base plate 124 from damage when the composite ply 106 is cut to shape.

The cutting device 178 is movable relative to the ply carrier 104. For example, the cutting device 178 operates in the three-dimensional X, Y, Z coordinate system. In one or more examples, the trim system 114 includes a support platform 180 that is configured to selectively move and position the cutting device 178 relative to the carrier transfer device 110 and, thus, the ply carrier 104. The support platform 180 may be any suitable machine capable of automatically driving and controlling movement of the cutting device 178, such as a robot, a robotic arm, and overhead gantry and the like.

It should be recognized that in some implementations of the system 100, such as depending on the overall ply shape of the composite ply 106 after lamination and the type of composite structure 102 being fabricated, that the trimming and scrap removing operations may not be required. In such examples, the composite ply 106 is provided directly to the transfer system 116 from the lamination system 112.

In one or more examples, the scrap removal system 142 is configured to remove a remnant of (e.g., scrap cut from) the composite ply 106 from the ply support surface 108, after the composite ply 106 is cut into the predetermined shape by the trim system 114. For example, in production, the carrier transfer device 110 positions the ply carrier 104 relative to the scrap removal system 142, which automatically separates and takes away the remnant of the composite ply 106 from the ply support surface 108 of the ply carrier 104.

As described above, in one or more examples, the retention vacuum may be selectively removed from designated portions of the film 126 to enable removal of the remnant from the ply support surface 108. For example, the retention vacuum provided by select ones of the vacuum zones 204 (e.g., as shown in FIG. 7), corresponding to portions of the film 126 on which the remnant is located, may be selectively turned off during removal of the remnant.

In one or more examples, the scrap removal system 142 includes at least one scrap-removing device 182. The scrap-removing device 182 is configured to locate, engage and remove the remnant of the composite ply 106. The scrap-removing device 182 may be any machine or device capable of manipulating the remnant and removing the remnant from the ply carrier 104. In one or more examples, the scrap-removing device 182 includes, or takes the form of, a robotic end effector. The scrap-removing device 182 includes parts and components (e.g., drive motors, actuators, grippers, sensors and the like) that enable the scrap-removing device 182 to automatically remove the remnant. As an example, the scrap-removing device 182 may be a pick-and-place gripper. As another example, the scrap-removing device 182 may be a vacuum gripper or vacuum roller.

The scrap-removing device 182 is movable relative to the ply carrier 104. For example, the scrap-removing device 182 operates in a three-dimensional X, Y, Z coordinate system. In one or more examples, the scrap removal system 142 includes a support platform 184 that is configured to selectively move and position the scrap-removing device 182 relative to the carrier transfer device 110 and, thus, the ply carrier 104. The support platform 184 may be any suitable machine capable of automatically driving and controlling movement of the scrap-removing device 182, such as a robot, a robotic arm, and overhead gantry and the like. In one or more examples, the scrap-removing device 182 may be configured to automatically place scrap remnants in a scrap container for subsequent removal.

In one or more examples, the trim system 114 and the scrap removal system 142 may be integrated within a single workstation. In these examples, the cutting device 178 and the scrap-removing device 182 may share the same support platform.

In one or more examples, the transfer system 116 is configured to remove the ply carrier 104 from the carrier transfer device 110. The transfer system 116 is configured to apply the composite ply 106 to at least a portion of a forming surface 118 of the forming tool 120. The transfer system 116 is further configured to release the film 126 from the base plate 124 while retaining the base plate 124, after application of the composite ply 106 to at least a portion of the forming surface 118 of the forming tool 120. The transfer system 116 is configured to return the base plate 124 to the carrier transfer device 110, after application of the composite ply 106 to at least a portion of the forming surface 118 of the forming tool 120. For example, in production, the carrier transfer device 110 positions the ply carrier 104 and the tool transfer device 146 positions the forming tool 120 relative to the transfer system 116, which automatically removes the ply carrier 104 from the carrier transfer device 110, applies the composite ply 106 to the forming tool 120 and returns the ply carrier 104 to the carrier transfer device 110.

In one or more examples, the transfer system 116 applies a plurality of composite plies 106 to the forming tool 120 one at a time according to the ply laydown sequence. The transfer system 116 is capable of providing the composite ply 106 at different locations on the forming tool 120. As such, a technician is not required to retrieve individual plies from a workstation and then manually position each ply to a laydown location on the forming tool in accordance with the ply laydown sequence.

In one or more examples, the transfer system 116 includes at least one transferring device 186. The transferring device 186 is configured to manipulate the ply carrier 104. The transferring device 186 may be any suitable machine or device capable of removing the ply carrier 104 from the carrier transfer device 110 and applying (e.g., stamping) the composite ply 106 to the forming tool 120. In one or more examples, the transferring device 186 includes, or takes the form of, a robotic end effector. The transferring device 186 includes parts and components (e.g., drive motors, actuators, grippers, bearings, sensors and the like) that enable the transferring device 186 to automatically apply the composite ply 106 to the forming tool 120.

In one or more examples, the transferring device 186 is configured to remove the ply carrier 104 from the carrier transfer device 110. In one or more examples, the transferring device 186 is configured to orient the ply carrier 104 relative to the forming tool 120. In one or more examples, the transferring device 186 is configured to press the ply carrier 104 against the forming surface 118 to apply the composite ply 106 to the forming tool 120. In one or more examples, the transferring device 186 is configured to remove the ply carrier 104 from the forming surface 118, thereby leaving the composite ply 106 on (e.g., tacked to) the forming tool 120.

In one or more examples, the transfer system 116 is configured to reorient the ply carrier (e.g., flip the ply carrier or rotate the ply carrier 104 one hundred eighty degrees about a horizontal axis), before application of the composite ply 106 to at least a portion of the forming surface 118 of the forming tool 120. For example, in production, the ply carrier 104 is introduced to the transfer system 116 by the carrier transfer device 110 with the composite ply 106 facing substantially upward. The transfer system 116 reorients (e.g., flips) the ply carrier 104 such that the composite ply 106 is facing toward the forming surface 118 of the forming tool 120 (e.g., facing substantially downward).

As illustrated in FIGS. 2-4, in one or more examples, the transfer system 116 includes a plurality transferring devices 186. For example, the transfer system 116 includes a first one of the transferring devices 186 associated with a first stage of the transferring operation and a second one of the transferring devices 186 associated with a second stage of the transferring operation.

In one or more examples, the first one of the transferring devices 186 is configured to engage the ply carrier 104 and to remove the ply carrier 104 from the carrier transfer device 110. For example, the ply carrier 104 is located at a first stage of the transfer system 116 and the first one of the transferring devices 186 in position to remove the ply carrier 104 from the carrier transfer device 110. The first one of the transferring devices 186 is configured to support and maintain the composite ply 106 on the ply support surface 108 of the ply carrier 104 after removal of the ply carrier 104 from the carrier transfer device 110.

In one or more examples, as illustrated in FIG. 3, the first one of the transferring devices 186 is configured to then reorient (e.g., flip) the ply carrier 104 for hand-off to the second one of the transferring devices 186. The first one of the transferring devices 186 may also be configured to position (e.g., move) the ply carrier 104 for hand-off to the second one of the transferring devices 186. For example, the ply carrier 104 is removed from the carrier transfer device 110 and reoriented and repositioned for hand-off to the second one of the transferring devices 186. The first one of the transferring devices 186 is configured to support and maintain the composite ply 106 on the ply support surface 108 of the ply carrier 104, during and after reorientation of the ply carrier 104. For example, the first one of the transferring devices 186 may physically contact the composite ply 106 or otherwise clamp the composite ply 106 between the first one of the transferring devices 186 and the ply carrier 104.

The second one of the transferring devices 186 is configured to remove the ply carrier 104 from the first one of the transferring devices 186. The second one of the transferring devices 186 is configured to support and maintain the composite ply 106 on the ply support surface 108 of the ply carrier 104, after removal from the first one of the transferring devices 186. For example, as described herein above, the film 126 and, thus, the composite ply 106, is retained on the base plate 124 via the vacuum retention. The second one of the transferring devices 186 is configured to maintain the retention vacuum to the plurality of vacuum apertures 128 of the base plate 124 to retain the film 126 on the base plate 124, after removal of the ply carrier 104 from the carrier transfer device 110. In one or more examples, the second one of the transferring devices 186 includes a vacuum table 190 (FIG. 3). With the ply carrier 104 positioned on the second one of the transferring devices 186, the vacuum table 190 is in fluid communication with the plurality of vacuum apertures 128 of the base plate 124. The vacuum table 190 is configured to apply the retention vacuum to the plurality of vacuum apertures 128 to retain the film 126 on the base plate 124.

The second one of the transferring devices 186 is configured to press (e.g., stamp) the ply carrier 104 against the forming tool 120, thereby applying the composite ply 106 to the forming surface 118 of the forming tool 120. The second one of the transferring devices 186 is configured to release the film 126 from the base plate 124 and remove the base plate 124 from the forming tool 120, thereby leaving the composite ply 106, and the film 126 coupled to the composite ply 106, on the forming tool 120. For example, the second one of the transferring devices 186 is configured to selectively remove the retention vacuum to release the film 126 from the base plate 124.

The second one of the transferring devices 186 is configured to then position (e.g., move) the ply carrier 104 for hand-off back to the first one of the transferring devices 186. The first one of the transferring devices 186 is configured to remove the base plate 124 from the second one of the transferring devices 186. For example, as illustrated in FIG. 4 illustrates the ply carrier 104 (e.g., the base plate 124 without the film 126) passed back to the first one of the transferring devices 186. The first one of the transferring devices 186 is configured to then return the base plate 124 to the carrier transfer device 110.

The transferring device 186 is movable relative to the carrier transfer device 110 and the forming tool 120. For example, the transferring device 186 operates in the three-dimensional X, Y, Z coordinate system. As an example, the first one of the transferring devices 186 is movable relative to ply carrier 104, before removing the ply carrier 104 from the carrier transfer device 110, and is movable relative to the carrier transfer device 110, after removal of the ply carrier 104. The second one of the transferring devices 186 is movable relative to the forming tool 120. Additionally, or alternatively, the forming tool 120 is movable relative to the transferring device 186. In either example, the transferring device 186 is positionable at different locations along the forming tool 120 to facilitate streamlining the ply laydown workflow process.

In one or more examples, the transfer system 116 includes a support platform 188 that is configured to selectively move and position the transferring device 186 relative to the carrier transfer device 110 and the forming tool 120. The support platform 188 may be any suitable machine capable of automatically driving and controlling movement of the transferring device 186, such as a robot, a robotic arm, and overhead gantry and the like. In one or more examples, the first one and the second one of the transferring devices 186 share the same support platform 188.

In one or more examples, the forming system 122 is configured to form the composite ply 106 over at least a portion of the forming surface 118 of the forming tool 120. For example, in production, the tool transfer device 146 positions the forming tool 120 relative to the forming system 122, which automatically forms the composite ply 106 over the forming surface 118 of the forming tool 120.

In one or more examples, the forming system 122 includes at least one forming device 192. The forming device 192 is configured to compress the composite ply 106 and form the composite ply 106 over the forming surface 118 of the forming tool 120. The forming device 192 may be any suitable machine or device capable of forming the composite ply 106 to the shape of the forming surface 118 of the forming tool 120. In one or more examples, the forming device 192 includes, or takes the form of, a robotic end effector. The forming device 192 includes parts and components (e.g., drive motors, actuators, bearing, rollers, sensors and the like) that enable automatic formation of the composite ply 106 over the forming tool 120.

In one or more examples, the forming tool 120, or at least a portion of the forming surface 118, has a complex geometry and is contoured along one or more planes. In operation, the forming device 192 moves across the forming surface 118 of the forming tool 120 to form and compact the composite ply 106 on the forming tool 120. Thus, the forming system 122 is provided with the dynamic ability to adjust to variations in the shape, taper and/or contour of the forming tool 120, and to facilitate maintaining parallelism with the contoured forming surface 118 of the forming tool 120. As such, the composite structure 102 formed using the forming system 122 may be provided with reduced ply wrinkling, thereby reducing disruptions in manufacturing flow and production of defective parts.

The forming device 192 is movable relative to the forming tool 120. For example, the forming device 192 operates in the three-dimensional X, Y, Z coordinate system. In one or more examples, the forming system 122 includes a support platform 194 that is configured to selectively move and position the forming device 192 relative to the forming tool 120. The support platform 194 may be any suitable machine capable of automatically driving and controlling movement of the forming device 192, such as a robot, a robotic arm, and overhead gantry and the like.

Additionally, or alternatively, the forming tool 120 is movable relative to the forming device 192. In either example, the forming device 192 is positionable at different locations along the forming tool 120 to facilitate streamlining the ply compaction workflow process.

In one or more examples, the film removal system 160 is configured to remove the film 126 from the composite ply 106, after the composite ply 106 is formed over at least a portion of the forming surface 118 of the forming tool 120. For example, in production, the tool transfer device 146 positions the forming tool 120 relative to the film removal system 160, which automatically pulls the film 126 from the composite ply 106.

In one or more examples, the film removal system 160 includes at least one film-removing device 196. The film-removing device 196 is configured to engage and remove the film 126 from the composite ply 106. The film-removing device 196 may be any machine or device capable of manipulating the film 126 and removing the film 126 from the composite ply 106. In one or more examples, the film-removing device 196 includes, or takes the form of, a robotic end effector. The film-removing device 196 includes parts and components (e.g., drive motors, actuators, grippers, sensors and the like) that enable the film-removing device 196 to automatically remove the film 126. As example, the film-removing device 196 is a vacuum gripper or vacuum roller.

In one or more examples, the film-removing device 196 is configured to peel the film 126 away from the composite ply 106 according to one or more predefined peeling parameters. As an example, the film-removing device 196 is configured to peel the film 126 away from the composite ply 106 in a predetermined peel direction relative to the fiber orientation of the composite ply, such as parallel to the direction of the fibers of the composite ply 106. As another example, the film-removing device 196 is configured to peel the film 126 away from the composite ply 106 at a predetermined peel angle. As an example, the film-removing device 196 is configured to initiate peeling of the film 126 at a predetermined peel initiation zone.

The film-removing device 196 is movable relative to the forming tool 120. For example, the film-removing device 196 operates in a three-dimensional X, Y, Z coordinate system. In one or more examples, the film removal system 160 includes a support platform 198 that is configured to selectively move and position the film-removing device 196 relative to the forming tool 120 and, thus, the composite ply 106. The support platform 198 may be any suitable machine capable of automatically driving and controlling movement of the film-removing device 196, such as a robot, a robotic arm, and overhead gantry and the like.

In one or more examples, the forming system 122 and the film removal system 160 may be integrated within a single workstation. In these examples, the forming device 192 and the film-removing device 196 may share the same support platform.

Figure 12:
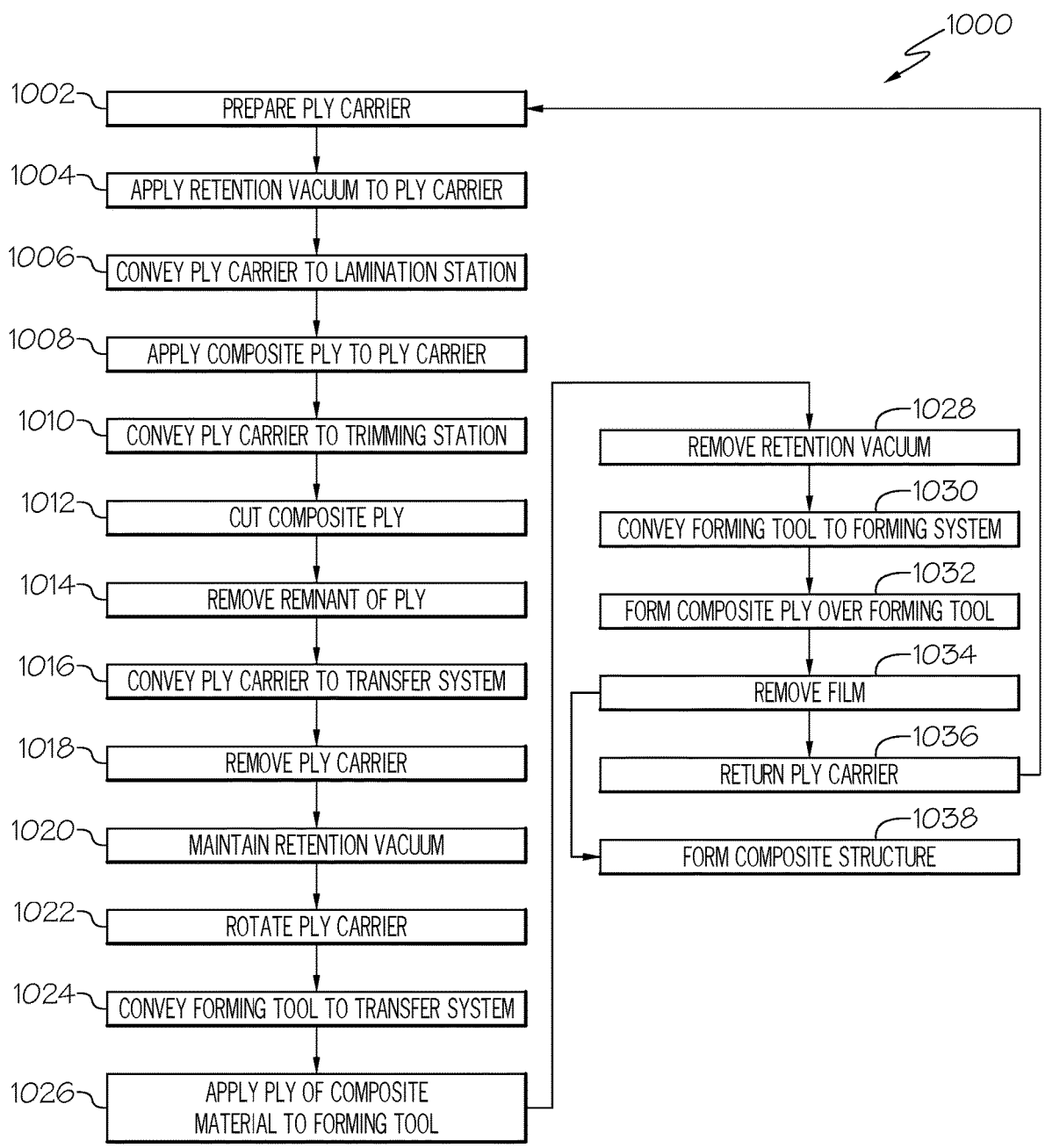
FIG. 12 is a flow diagram of an example of a method of fabricating a composite structure.

Referring now to FIG. 12, which illustrates an example of the method 1000 that utilizes the system 100 (e.g., shown in FIGS. 1-11) to fabricate the composite structure 102.

In one or more examples, the method 1000 includes a step of (block 1002) preparing the ply carrier 104. In one or more examples, the carrier transfer device 110 is provided to the carrier preparation system 162 for preparation of the ply carrier 104. For example, the carrier transfer device 110 is conveyed to the carrier preparation system 162 using the positioning system 144. In one or more examples, the base plate 124 is coupled to the carrier transfer device 110 and is indexed relative to the carrier transfer device 110 using the indexing structure 140. In one or more examples, the film 126 is applied to the base plate 124 to form the ply support surface 108.

In one or more examples, the method 1000 includes a step of (block 1004) selectively applying the retention vacuum to retain the film 126 on the base plate 124 using the carrier transfer device 110. For example, the retention vacuum is applied to the ply carrier 104 via the vacuum table 130.

In one or more examples, the method 1000 includes a step of (block 1006) conveying the ply carrier 104 to the lamination system 112 using the carrier transfer device 110. For example, the carrier transfer device 110 moves along the positioning system 144 to a predefined location relative to the lamination system 112. In one or more examples, the carrier transfer device 110 and, thus, the ply carrier 104, is indexed relative to the lamination system 112 using the indexing device 148.

In one or more examples, the method 1000 includes a step of (block 1008) selectively applying the composite ply 106 to the ply support surface 108 of the ply carrier 104 using the lamination system 112. The lamination system 112 may operate according to programmed instructions to lay down and laminate composite material on the ply support surface 108. For example, the lamination system 112 may operate according to the predetermined ply laydown sequence such that the fabricated composite ply 106 corresponds to the next composite ply 106 to be applied to the forming tool 120. Following fabrication of the composite ply 106, the composite ply 106 is adhered (e.g., tacked) to the film 126 by the resin matrix of the composite ply 106.

In one or more examples, the method 1000 includes a step of (block 1010) conveying the ply carrier 104 from the lamination system 112 to the trim system 114 using the carrier transfer device 110. For example, the carrier transfer device 110 moves along the positioning system 144 to a predefined location relative to the trim system 114. In one or more examples, the carrier transfer device 110 and, thus, the ply carrier 104 and the composite ply 106, is indexed relative to the trim system 114 using the indexing device 148.

In one or more examples, the method 1000 includes a step of (block 1012) selectively cutting the composite ply 106 into the predetermined shape using the trim system 114. The trim system 114 may operate in accordance to programmed instructions that define the predetermined shape to be cut in the composite ply 106.

In one or more examples, the method 1000 includes a step of (block 1014) removing a remnant of the at least one composite ply 106 from the ply support surface 108 using the scrap removal system 142, after the step of (block 1012) selectively cutting the at least one composite ply 106. For example, the carrier transfer device 110 is conveyed along the positioning system 144 to a predefined location relative to the scrap removal system 142. In one or more examples, the carrier transfer device 110 and, thus, the ply carrier 104 and the composite ply 106, is indexed relative to the scrap removal system 142 using the indexing device 148.

In one or more examples, the method 1000 includes a step of selectively removing the retention vacuum from select areas of the film 126 using the carrier transfer device 110. For example, the retention vacuum is removed from areas of the film 126 corresponding to the remnant to be removed from the ply carrier 104.

In one or more examples, the method 1000 also includes a step of (block 1016) conveying the ply carrier 104 from the trim system 114 to the transfer system 116 using the carrier transfer device 110. For example, the carrier transfer device 110 moves along the positioning system 144 to a predefined location relative to the transfer system 116. In one or more examples, the carrier transfer device 110 and, thus, the ply carrier 104 and the composite ply 106, is indexed relative to the transfer system 116 using the indexing device 148.

In one or more examples, the method 1000 includes a step of (block 1018) removing the ply carrier 104 from the carrier transfer device 110 and a step of (block 1022) reorienting (e.g., rotating) the ply carrier 104 using the transfer system 116. In one or more examples, the method 1000 includes a step of (block 1020) maintaining the retention vacuum to retain the film 126 on the base plate 124 using the transfer system 116. The step of (block 1020) maintaining the retention vacuum is performed during and after the step of (block 1018) removing of the ply carrier 104 and the step of (block 1022) reorienting the ply carrier 104. For example, the retention vacuum is applied to the ply carrier 104 via the vacuum table 190 (FIG. 4) of the transferring device 186.

In one or more examples, the method 1000 includes a step of (block 1024) conveying the forming tool 120 to the transfer system 116 using the tool transfer device 146. For example, the tool transfer device 146 moves along the positioning system 144 to a predefined location relative to the transfer system 116. In one or more examples, the tool transfer device 146 is indexed relative to the transfer system 116 using the indexing device 148.

In one or more examples, the method 1000 includes a step of (block 1026) applying the composite ply 106 to at least a portion of the forming surface 118 of the forming tool 120 using the transfer system 116. For example, the ply carrier 104 is positioned at a predefined location along the forming tool 120 according to the predetermined ply laydown sequence. The ply carrier 104 is oriented such that the composite ply 106 is parallel to at least a portion of the forming surface 118 of the forming tool 120. The ply carrier 104 is pressed on the forming tool 120 to compress the composite ply 106 against a portion of the forming surface 118 of the forming tool 120. In one or more examples, the ply carrier 104 may deform when pressed against the forming tool 120, thereby enabling the composite ply 106 to be applied to a greater portion of the contoured forming surface 118.

In one or more examples, the method 1000 includes a step of releasing the film 126 from the base plate 124 and a step of removing the ply carrier 104 (e.g., the base plate 124) from the forming tool 120 using the transfer system 116, after the step of (block 1026) applying the composite ply 106 to at least a portion of the forming surface 118 of the forming tool 120. For example, the method 1000 includes a step of (block 1028) selectively removing the retention vacuum to release the film 126 from the base plate 124 while retaining the base plate 124 using the transfer system 116. Following application of the composite ply 106 to the forming tool 120, the composite ply 106 is coupled (e.g., adhered or tacked) to the forming surface 118 and the film 126 remains coupled (e.g., adhered or tacked) to the composite ply 106 by the resin matrix of the composite ply 106.

In one or more examples, the method 1000 includes a step of (block 1030) conveying the forming tool 120 from the transfer system 116 to the forming system 122 using the tool transfer device 146. For example, the tool transfer device 146 moves along the positioning system 144 to a predefined location relative to the forming system 122. In one or more examples, the tool transfer device 146 and the composite ply 106 are indexed relative to the forming system 122 using the indexing device 148.

In one or more examples, the method 1000 includes a step of (block 1032) forming the composite ply 106 over the at least a portion of the forming surface 118 of the forming tool 120 using the forming system 122. In one or more examples, the film 126 provides a protective barrier between the forming system 122 and the composite ply 106 during formation of the composite ply 106 over the forming tool 120.

In one or more examples, the method 1000 includes a step of (block 1034) removing the film 126 from the composite ply 106 using the film removal system 160. The step of (block 1034) removing the film 126 is preformed after the step of (block 1032) forming the composite ply 106.

In one or more examples, the method 1000 includes a step of (block 1036) returning the ply carrier 104 (e.g., the base plate 124) to the carrier transfer device 110 using the transfer system 116. The step of (block 1036) returning the ply carrier 104 is performed after the step of (block 1026) applying the composite ply 106 to the forming tool 120.

In one or more examples, the above operations are repeated a number of times to fully form the composite structure 102 (block 1038), at which point the process terminates. In one or more examples, a plurality of composite plies 106 are sequentially fabricated and applied to and formed over the forming tool 120 according the ply-by-ply laydown sequence. For example, a first one of the plurality of composite plies 106 is applied to and is formed over a first portion of the forming tool 120. During a second iteration of the above process, a second one of the plurality of composite plies 106 is applied to and is formed over a second portion of the forming tool 120. This iterative process is repeated until the composite structure 102 is formed.

In one or more examples, the forming tool 120 may be simultaneously located at the transfer system 116 and the forming system 122. For example, the first portion of the forming tool 120 may be conveyed to the transfer system 116 for application of the first one of the plurality of composite plies 106. The first portion of the forming tool 120 may then be conveyed to forming system 122 while a second portion of the forming tool 120 is conveyed to the transfer system 116. The second one of the composite plies 106 may be applied to the second portion of the forming tool 120 while the first one of the composite plies 106 is being formed over the forming tool 120. As such, the step of (block 1026) applying the second one of the composite plies 106 and the step of (block 1032) forming the first one of the composite plies 106 are performed simultaneously, thereby reducing cycle time.

In one or more examples, the steps of conveying the ply carrier (e.g., blocks 1006, 1010 and 1016) include a step of operatively translating the carrier transfer device 110 between the carrier preparation system 162, the lamination system 112, the trim system 114 (when applicable), the scrap removal system 142 (when applicable) and the transfer system 116, for example, as illustrated in FIG. 10.

In one or more examples, the steps of conveying the ply carrier (e.g., blocks 1006, 1010 and 1016) include a step of operatively circulating the carrier transfer device 110 through the carrier preparation system 162, the lamination system 112, the trim system 114 (when applicable), the scrap removal system 142 (when applicable) and the transfer system 116, for example, as illustrated in FIG. 11.

In one or more examples, the steps of conveying the forming tool 120 (e.g., blocks 1024 and 1030) include a step of operatively translating the tool transfer device 146 between the transfer system 116, the forming system 122 and the film removal system 160, for example, as illustrated in FIG. 10.

In one or more examples, the steps of conveying the forming tool 120 (e.g., blocks 1024 and 1030) include a step of operatively circulating the tool transfer device 146 through the transfer system 116, the forming system 122 and the film removal system 160, for example, as illustrated in FIG. 11.

In one or more examples, the method 1000 includes a step of selectively positioning the carrier transfer device 110 at a plurality of specified locations relative to each one of the carrier preparation system 162, the lamination system 112, the trim system 114 (when applicable), the scrap removal system 142 (when applicable) and the transfer system 116 using the indexing device 148.

In one or more examples, the method 1000 includes a step of selectively positioning the tool transfer device 146 at a plurality of specified locations relative to each one of the transfer system 116, the forming system 122 and the film removal system 160 using the indexing device 148.

Referring to FIG. 1, in one or more examples, the system 100 includes a controller 158. In one or more examples, the controller 158 is configured to control operation of the system 100 and/or implement the operational steps of the method 1000.

The controller 158 is in communication with and is programmed to control operation of at least one of the carrier transfer device 110, the tool transfer device 146, the positioning system 144, the carrier preparation system 162, the lamination system 112, the trim system 114, the scrap removal system 142, the transfer system 116, the forming system 122 and the film removal system 160. In one or more examples, the on-demand fabrication, transfer, application and formation of the composite ply 106 is facilitated by the controller 158. The controller 158 may be any device capable of facilitating communication between itself and the various sub-systems of the system 100. For example, the controller 158 may be a computer workstation, a programmable logic controller (PLC), a mobile device or other electronic controller.

In one or more examples, the controller 158 includes a user interface. The user interface may be used by an operator to facilitate semi-autonomous operation of the system 100, such as by triggering movement of the carrier transfer device 110 and the tool transfer device 146 or by triggering various sub-systems of the system 100 to perform the next step in the ply-by-ply formation process. For example, operation of the system 100 may be controlled semi-autonomously based on a triggering event, such as a command received from the operator, at various stages in the fabrication process.

Alternatively, one or more triggering events may be provided automatically by the controller 158 to facilitate reducing the workload of the operator. For example, one or more of the sub-systems of the system 100 may include at least one sensor in communication with the controller 158. The sensor is configured to monitor a condition a respective sub-system or parameter of a respective operational stage and to transmit a signal to the controller 158 indicated completion of a respective operation. The signal provides an indication to the controller 158 that the next operational step in the fabrication process may be performed and that the next sub-system in the fabrication sequence is ready.

In one or more examples, conveyance of the carrier transfer device 110 and/or the tool transfer device 146 is controlled under direction from the controller 158. For example, the carrier transfer device 110 and/or the tool transfer device 146 are moved along the positioning system 144 under direction from the controller 158.

In one or more examples, the controller 158 is programmed to selectively convey the ply carrier 104 to the carrier preparation system 162 using the carrier transfer device 110 and the positioning system 144. The controller 158 is programmed to prepare the ply carrier 104 using the carrier preparation system 162.

In one or more examples, the controller 158 is programmed to selectively convey the ply carrier 104 to the lamination system 112 using the carrier transfer device 110 and the positioning system 144. The controller 158 is programmed to lay down the composite ply 106 using the lamination system 112. For example, the controller 158 is programmed to selectively apply the composite ply 106 to the ply support surface 108 of the ply carrier 104 using the lamination system 112.

In one or more examples, the controller 158 is programmed to selectively convey the ply carrier 104 to the trim system 114 using the carrier transfer device 110 and the positioning system 144. The controller 158 is programmed to selectively cut the composite ply 106 into the predetermined shape using the trim system 114.

In one or more examples, the controller 158 is programmed to selectively convey the ply carrier 104 to the scrap removal system 142 using the carrier transfer device 110 and the positioning system 144. The controller 158 is programmed to remove the remnant of the composite ply 106 from the ply support surface 108 using the scrap removal system 142, after the composite ply 106 is cut into the predetermined shape.

In one or more examples, the controller 158 is programmed to selectively convey the forming tool 120 to the transfer system 116 using the tool transfer device 146 and the positioning system 144. The controller 158 is programmed to selectively convey the ply carrier 104 to the transfer system 116 using the carrier transfer device 110 and the positioning system 144. The controller 158 is programmed to transfer the composite ply 106 to the forming tool 120 using the transfer system 116. For example, the controller 158 is programmed to remove the ply carrier 104 from the carrier transfer device 110, reorient (e.g., flip) the ply carrier 104, before application of the composite ply 106, and apply the composite ply 106 to at least a portion of the forming surface 118 of the forming tool 120 using the transfer system 116.

In one or more examples, the controller 158 is programmed to selectively convey the forming tool 120 to the forming system 122 using the tool transfer device 146 and the positioning system 144. The controller 158 is programmed to form the composite ply 106 over the forming tool 120 using the forming system 122.

In one or more examples, the controller 158 is programmed to selectively convey the forming tool 120 to the film removal system 160 using the tool transfer device 146 and the positioning system 144. The controller 158 is programmed to remove the film 126 from the composite ply 106 using the film removal system 160, after the composite ply 106 is formed over the forming tool 120.

In one or more examples, the controller 158 is programmed to return the ply carrier 104 (e.g., the base plate 124) to the carrier transfer device 110 using the transfer system 116, after application of the composite ply 106 to the forming tool 120.

In one or more examples, the controller 158 is programmed to selectively convey the ply carrier 104 back to the carrier preparation system 162 using the carrier transfer device 110 and the positioning system 144.

In one or more examples, the controller 158 is programmed to selectively apply the retention vacuum to the plurality of vacuum apertures 128 of the base plate 124 of the ply carrier 104 to retain the film 126 on the base plate 124 using the carrier transfer device 110.

In one or more examples, the controller 158 is programmed to maintain the retention vacuum to the plurality of vacuum apertures 128 to retain the film 126 on the base plate 124 using the transfer system 116, after removal of the ply carrier 104 from the carrier transfer device 110.

In one or more examples, the controller 158 is programmed to selectively remove the retention vacuum from the plurality of vacuum apertures 128 to release the film 126 from the base plate 124 while retaining the base plate 124 using the transfer system 116, after application of the at least one composite ply 106 to the at least a portion of the forming surface 118 of the forming tool 120.

In one or more examples, the controller 158 is programmed to selectively position the carrier transfer device 110 relative to each one of the carrier preparation system 162, the lamination system 112, the trim system 114 (when applicable), the scrap removal system 142 (when applicable) and the transfer system 116 using the positioning system 144. In one or more examples, the controller 158 is programmed to operatively translate the carrier transfer device 110. In one or more examples, the controller 158 is further programmed to operatively circulate the carrier transfer device 110.

In one or more examples, the controller 158 is programmed to selectively position the tool transfer device 146 relative to the transfer system 116, the forming system 122 and the film removal system 160 using the positioning system 144. In one or more examples, the controller 158 is programmed to operatively translate the tool transfer device 146. In one or more examples, the controller 158 is programmed to operatively circulate the tool transfer device 146.

In one or more examples, the controller 158 is programmed to selectively position the carrier transfer device 110 at a plurality of specified locations relative to each one of the carrier preparation system 162, the lamination system 112, the trim system 114 (when applicable), the scrap removal system 142 (when applicable) and the transfer system 116 using the indexing device 148.

In one or more examples, the controller 158 is programmed to selectively position the tool transfer device 146 at a plurality of specified locations relative to each one of the transfer system 116, the forming system 122 and the film removal system 160 using the indexing device 148.

In one or more examples, one or more of the components, devices or sub-systems of the system 100 may include a dedicated controller that is in communication with and receives instructions from the controller 158.

In one or more examples, the controller 158 is programmed to track a plurality of composite plies 106 fabricated during manufacture of the composite structure 102. For example, the controller 158 tracks which one of the plurality of composite plies 106 is fabricated, applied and formed during the composite structure fabrication process according to the ply laydown sequence. In one or more examples, the controller 158 is programmed to track a plurality of ply carriers 104 and/or carrier transfer devices 110 flowing through the system 100. In one or more examples, the controller 158 is programmed to track a plurality of forming tools 120 and/or tool transfer devices 146 flowing through the system 100.

In one or more examples, the system 100 is configured to perform multiple operations substantially simultaneously or concurrently. For example, a first composite ply 106 may be formed over the forming tool 120, while a second composite ply 106 is being transferred and applied to the forming tool 120 (e.g., the same forming tool in the translating workflow or a different forming tool in the continuous workflow), while a third composite ply 106 is being cut, and while a fourth composite ply 106 is being laid down. As such, more than one carrier transfer device 110 and, thus, more than one composite ply 106 may be moved through the system 100 at the same time and more than one forming tool 120 and, thus, more than one composite structure 102 may be moved through the system 100 at the same time.

In one or more examples, the controller 158 is programmed to control more than one of the sub-systems and, thus, perform more than one operation simultaneously or in parallel. In one or more examples, the controller 158 is programmed to control all the sub-systems and, thus, perform all the operations simultaneously or in parallel.

Figure 13:
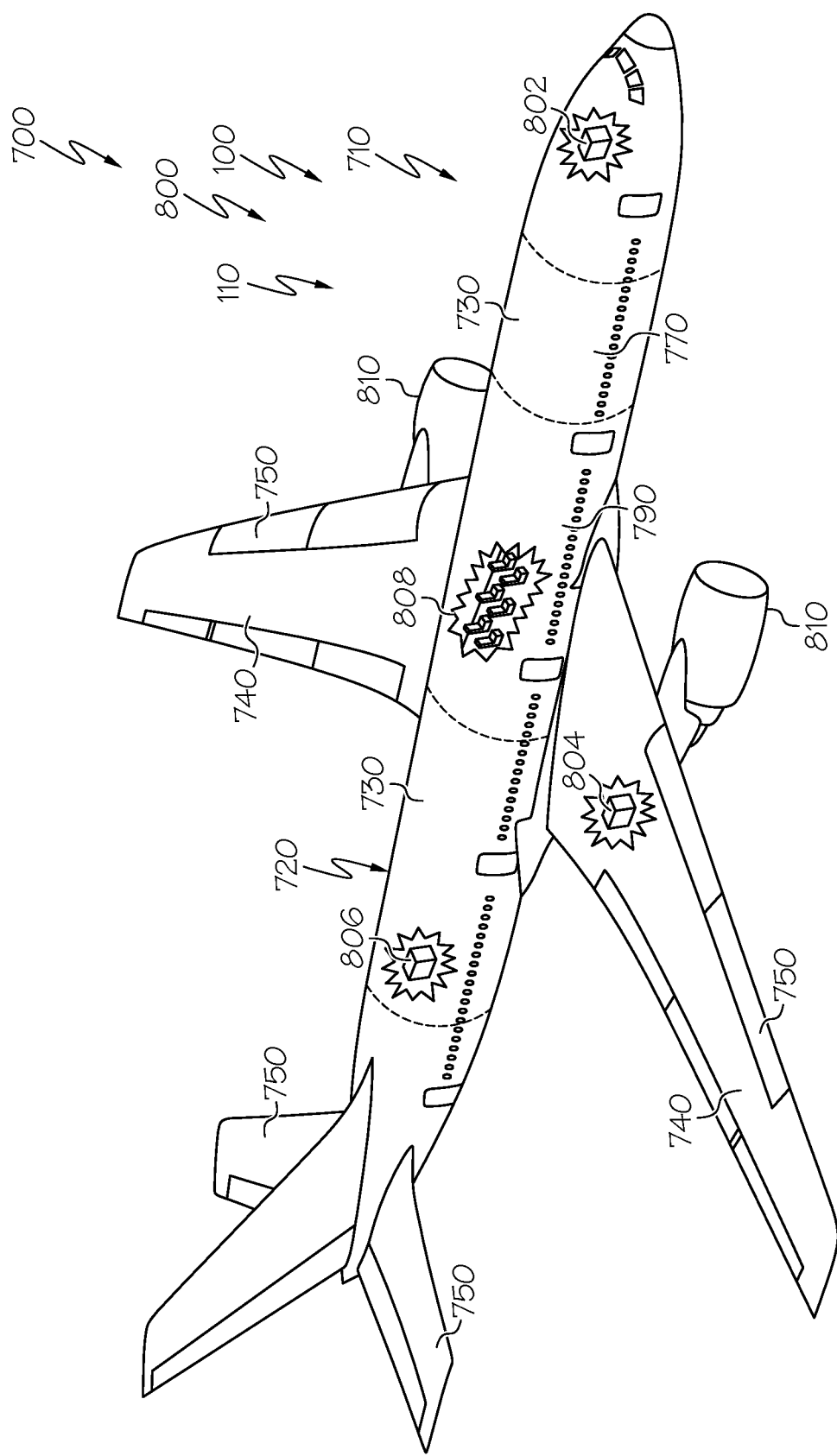
FIG. 13 is a schematic illustration of an aircraft that includes at least one composite structure.
Figure 14:
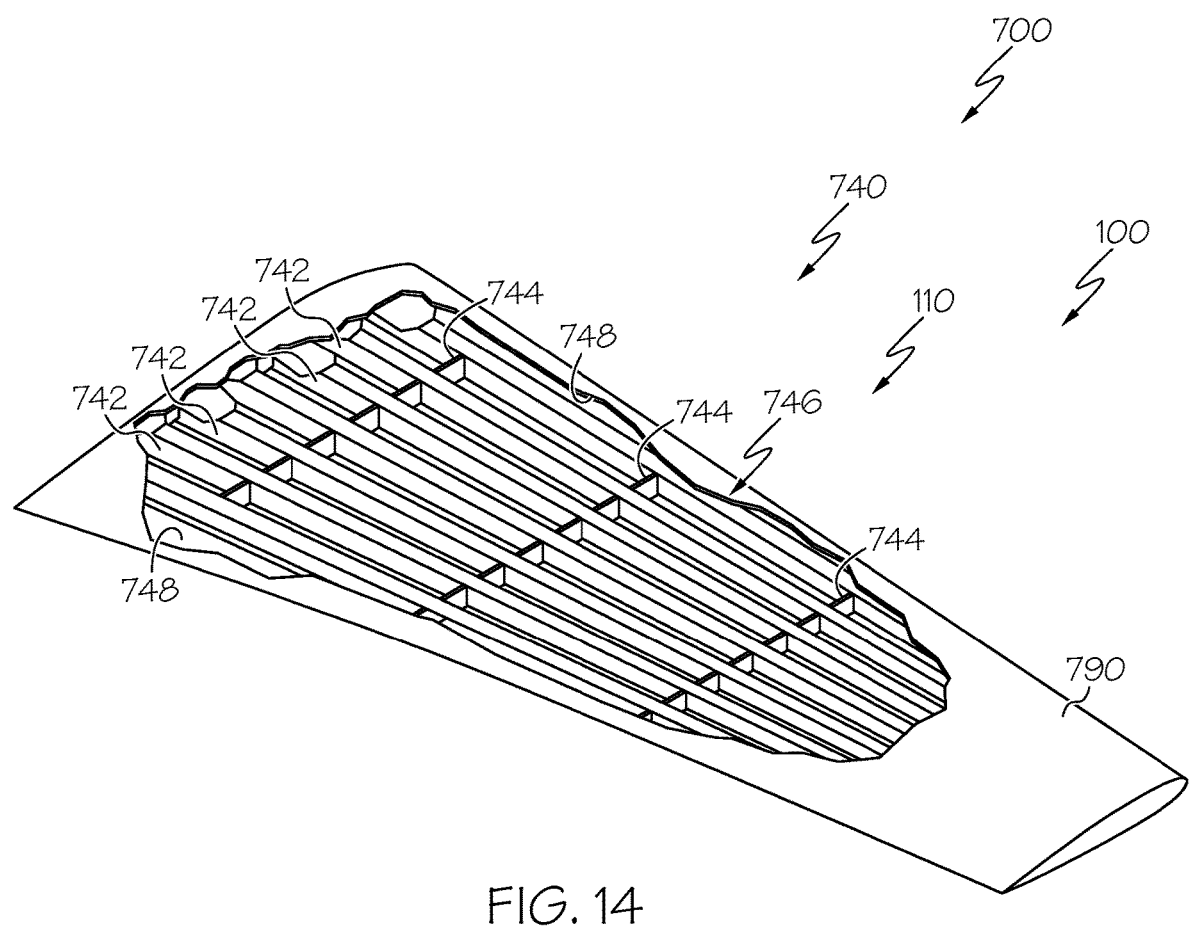
FIG. 14 is a schematic illustration of an example of a wing of the aircraft shown in FIG. 15.
Figure 15:
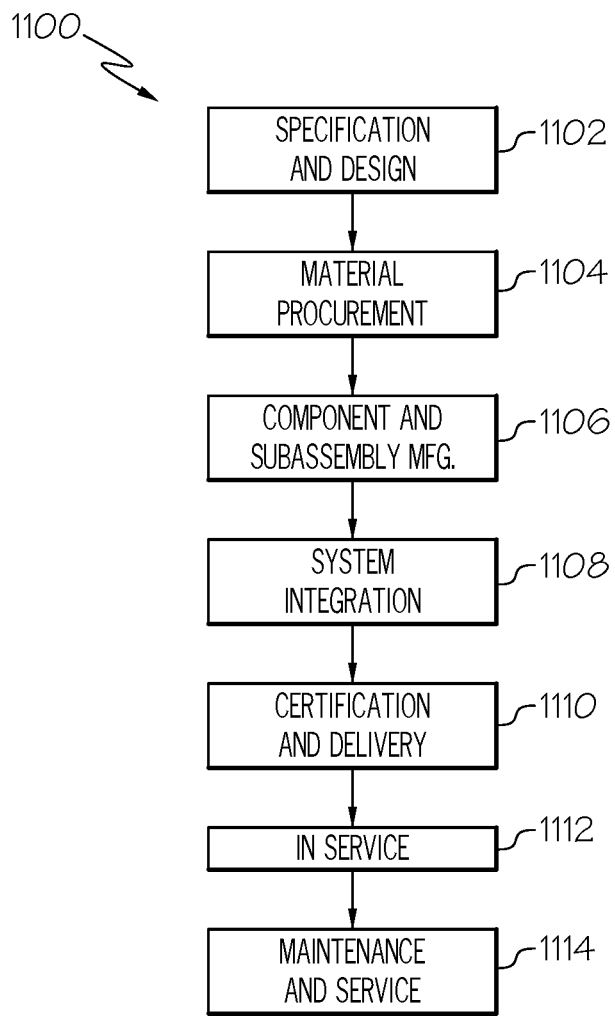
FIG. 15 is a flow diagram of an aircraft manufacturing and service methodology.

Referring now to FIGS. 13-15, examples of the system 100 and the method 1000 may be related to, or used in the context of, an aircraft manufacturing and service method 1100, as shown in the flow diagram of FIG. 15 and an aircraft 700, as schematically illustrated in FIG. 13. The composite structure 102 manufactured using the system 100 or in accordance with the method 1000 may be any one of a structure, an assembly, a sub-assembly, a component, a part, or any other portion of the aircraft 700, such as a portion of an airframe, interior, and one or more of the high-level systems. For example, the composite structure 102 may be any one of an aircraft spar, a wing section, a fuselage barrel section, an interior panel, an exterior skin panel, and the like.

FIG. 13 schematically illustrates an example of the aircraft 700. The aircraft 700 includes a plurality of high-level systems 800. Examples of the high-level systems 800 include one or more of a propulsion system 810, an electrical system 802, a hydraulic system 804, and an environmental control ("environmental") system 806. In other examples, the aircraft 700 may include any number of other types of systems, such as a communications system, a flight control system, a guidance system, a weapons system, and the like.

The aircraft 700 includes at least one composite structure 102. The composite structure 102 is at least partially fabricated utilizing the system 100 and/or the method 1000. The aircraft 700 may include a plurality of components, including an airframe 710, a fuselage 720, a fuselage barrel 730, an interior 808, a wing 740, and/or a stabilizer 750.

In one or more examples, the composite structure 102 includes at least one composite ply 106, such as a plurality of composite plies 106. The composite structure 102 may form a composite part or a portion of any suitable component of the aircraft 700. As an example, and as illustrated in FIG. 13, the aircraft 700 includes skin segments 790 that cover and/or form an outer surface of any suitable portion of the aircraft 700 and/or a plurality of stringers 770 that, together with a plurality of frames, may support an inner surface of the skin segments 790.

FIG. 14 schematically illustrates an example of the wing 740. In one or more examples, the wing 740 includes a plurality of wing stringers 742, which may extend along a length of the wing 740. The wing 740 may also include a plurality of spars 744, which also may be referred to herein as ribs. The wing stringers 742 and spars 744 together may form and/or define at least a portion of an inner support structure 746 for the wing 740, which may support an inner surface 748 of the skin segments 790 that cover the wing 740. The skin segments 790 may also be referred to herein as wing skin segments.

It is within the scope of the present disclosure that the skin segments 790 (e.g., wing skin or fuselage skin), stringers 770 (e.g., fuselage stringers), frames (e.g., multiple piece frames or one piece frames), wing stringers 742, spars 744, the inner support structure 746, floor beams, interior panels or various other components may be at least partially, or even completely, formed from the plies of composite material and/or may be a composite part that may be formed utilizing the system 100 and/or method 1000 disclosed herein.

Referring to FIG. 15, during pre-production, the method 1100 includes specification and design of the aircraft 700 (block 1102) and material procurement (block 1104). During production of the aircraft 700, component and subassembly manufacturing (block 1106) and system integration (block 1108) of the aircraft 700 take place. Thereafter, the aircraft 700 goes through certification and delivery (block 1110) to be placed in service (block 1112). Routine maintenance and service (block 1114) includes modification, reconfiguration, refurbishment, etc. of one or more systems of the aircraft 700. For example, the composite structure 102 manufactured in accordance with the method 1000 may be produced during material procurement (block 1104), component and subassembly manufacturing (block 1106), and/or maintenance and service (block 1114).

Each of the processes of the method 1100 illustrated in FIG. 15 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the aircraft 700, the composite structure 102, the system 100 and the method 1000 shown and described herein may be employed during any one or more of the stages of the manufacturing and service method 1100 shown in the flow diagram illustrated by FIG. 15. In an example, implementations of the system 100 and/or method 1000 may form a portion of component and subassembly manufacturing (block 1106) and/or system integration (block 1108). For example, composite structures 102 made using implementations of the disclosed system 100 and method 1000 may correspond to component and subassembly manufacturing (block 1106) and may be utilized in a manner similar to components or subassemblies prepared while the aircraft 700 is in service (block 1112). Also, implementations of the disclosed system 100 and the method 1000 may be utilized during system integration (block 1108) and certification and delivery (block 1110). Similarly, implementations of the disclosed system 100 and the method 1000 may be utilized, for example and without limitation, while the aircraft 700 is in service (block 1112) and during maintenance and service (block 1114).

Accordingly, referring to FIGS. 1-12, also disclosed is a method of fabricating a portion of the aircraft 700 (FIG. 13) using the system 100. Also disclosed is a portion of the aircraft 700 manufactured in accordance with the method 1000.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to systems for disinfecting an interior of other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 10 and 11, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements, features, and/or components described and illustrated in FIGS. 1-11, 13 and 14, referred to above, need be included in every example and not all elements, features, and/or components described herein are necessarily depicted in each illustrative example. Accordingly, some of the elements, features, and/or components described and illustrated in FIGS. 1-11, 13 and 14 may be combined in various ways without the need to include other features described and illustrated in FIGS. 1-11, 13 and 14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-11, 13 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-11, 13 and 14, and such elements, features, and/or components may not be discussed in detail herein with reference to each of FIGS. 1-11, 13 and 14. Similarly, all elements, features, and/or components may not be labeled in each of FIGS. 1-11, 13 and 14, but reference numerals associated therewith may be utilized herein for consistency.

In FIGS. 12 and 15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 12 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Further, the disclosure comprises embodiments according to the following clauses:

Clause 1. A system (100) for fabricating a composite structure (102), the system (100) comprising:
a ply carrier (104) comprising a ply support surface (108) configured to support at least one composite ply (106);
a carrier transfer device (110) configured to convey the ply carrier (104);
a lamination system (112) configured to selectively apply the at least one composite ply (106) to the ply support surface (108) of the ply carrier (104);
a transfer system (116) configured to remove the ply carrier (104) from the carrier transfer device (110) and to apply the at least one composite ply (106) to at least a portion of a forming surface (118) of a forming tool (120); and
a forming system (122) configured to form the at least one composite ply (106) over the at least a portion of the forming surface (118) of the forming tool (120).

Clause 2. The system (100) of Clause 1, further comprising a trim system (114) configured to selectively cut the at least one composite ply (106) into a predetermined shape.

Clause 3. The system (100) of Clause 2, further comprising a scrap removal system (142) configured to remove a remnant of the at least one composite ply (106) from the ply support surface (108) after the at least one composite ply (106) is cut into the predetermined shape.

Clause 4. The system (100) of Clause 1, wherein the ply carrier (104) further comprises:
a base plate (124); and
a film (126) positioned on the base plate (124), wherein the film (126) forms the ply support surface (108).

Clause 5. The system (100) of Clause 4, further comprising a carrier preparation system (162) configured to apply the film (126) to the base plate (124).

Clause 6. The system (100) of Clause 4, wherein:
the base plate (124) comprises a plurality of vacuum apertures (128); and
the carrier transfer device (110) comprises a vacuum table (130) in fluid communication with the plurality of vacuum apertures (128) and configured to apply a retention vacuum to the plurality of vacuum apertures (128) to retain the film (126) on the base plate (124).

Clause 7. The system (100) of Clause 6, wherein:
the base plate (124) comprises a sheet of spring steel; and
the film (126) comprises a sheet of polyethylene.

Clause 8. The system (100) of Clause 6, wherein:
the ply carrier (104) further comprises a liner (136) coupled to the base plate (124); and
the liner (136) is permeable by the retention vacuum.

Clause 9. The system (100) of Clause 8, wherein the liner (136) comprises a sheet of polypropylene.

Clause 10. The system (100) of Clause 8, wherein the liner (136) comprises a sheet of high-density polyethylene.

Clause 11. The system (100) of Clause 6, wherein the transfer system (116) is further configured to:
maintain the retention vacuum to the plurality of vacuum apertures (128) to retain the film (126) on the base plate (124) after removal of the ply carrier (104) from the carrier transfer device (110); and
rotate the ply carrier (104) one hundred eighty degrees about a horizontal before application of the at least one composite ply (106) to the at least a portion of the forming surface (118) of the forming tool (120).

Clause 12. The system (100) of Clause 11, wherein the transfer system (116) is further configured to release the film (126) from the base plate (124) while retaining the base plate (124) after application of the at least one composite ply (106) to the at least a portion of the forming surface (118) of the forming tool (120).

Clause 13. The system (100) of Clause 12, wherein the transfer system (116) is further configured to return the base plate (124) to the carrier transfer device (110).

Clause 14. The system (100) of Clause 4, further comprising a film removal system (160) configured to remove the film (126) from the at least one composite ply (106) after being formed over the at least a portion of the forming surface (118) of the forming tool (120).

Clause 15. The system (100) of Clause 1, further comprises an indexing structure (140) configured to operatively locate the ply carrier (104) at a specified location on the carrier transfer device (110).

Clause 16. The system (100) of Clause 1, further comprising a positioning system (144) configured to selectively position the carrier transfer device (110) relative to the lamination system (112) and the transfer system (116).

Clause 17. The system (100) of Clause 16, wherein the positioning system (144) comprises a linear carrier guide (150) configured to operatively translate the carrier transfer device (110) between the lamination system (112) and the transfer system (116).

Clause 18. The system (100) of Clause 16, wherein the positioning system (144) comprises a closed-loop carrier guide (154) configured to operatively circulate the carrier transfer device (110) through the lamination system (112) and the transfer system (116).

Clause 19. The system (100) of Clause 16, further comprising a tool transfer device (146) configured to convey the forming tool (120),
wherein the positioning system (144) is further configured to selectively position the tool transfer device (146) relative to the transfer system (116) and the forming system (122).

Clause 20. The system (100) of Clause 19, wherein the positioning system (144) comprises a linear tool guide (152) configured to operatively translate the tool transfer device (146) between the transfer system (116) and the forming system (122).

Clause 21. The system (100) of Clause 19, wherein the positioning system (144) comprises a closed-loop tool guide (156) configured to operatively circulate the tool transfer device (146) through the transfer system (116) and the forming system (122).

Clause 22. The system (100) of Clause 19, further comprising an indexing device (148), wherein the indexing device (148) is configured to:
operatively locate the carrier transfer device (110) at a plurality of specified locations relative to each one of the lamination system (112) and the transfer system (116); and
operatively locate the tool transfer device (146) at a plurality of specified locations relative to each one of the transfer system (116) and the forming system (122).

Clause 23. The system (100) of Clause 1, further comprising a controller (158) programmed to control operation of at least one of: the carrier transfer device (110), the lamination system (112) and the transfer system (116) and the forming system (122).

Clause 24. A system (100) for fabricating a composite structure (102), the system (100) comprising:
a ply carrier (104) comprising a ply support surface (108);
a carrier transfer device (110) configured to support the ply carrier (104);
a lamination system (112);
a transfer system (116) in sequential relation to the lamination system (112);
a forming system (122) in sequential relation to the transfer system (116); and
a controller (158) programmed to:
selectively convey the ply carrier (104) to the lamination system (112) using the carrier transfer device (110);
selectively apply at least on composite ply (106) to the ply support surface (108) of the ply carrier (104) using the lamination system (112);
selectively convey the ply carrier (104) from the lamination system (112) to the transfer system (116) using the carrier transfer device (110);
remove the ply carrier (104) from the carrier transfer device (110) and apply the at least one composite ply (106) to at least a portion of a forming surface (118) of a forming tool (120) using the transfer system (116); and
form the at least one composite ply (106) over the at least a portion of the forming surface (118) of the forming tool (120) using the forming system (122).

Clause 25. The system (100) of Clause 24, further comprising a trim system (114) in sequential relation between the lamination system (112) and the transfer system (116),
wherein the controller (158) is further programmed to:
selectively convey the ply carrier (104) from the lamination system (112) to the trim system (114) using the carrier transfer device (110);
selectively cut the at least one composite ply (106) into a predetermined shape using the trim system (114); and
selectively convey the ply carrier (104) from the trim system (114) to the transfer system (116) using the carrier transfer device (110).

Clause 26. The system (100) of Clause 25, further comprising a scrap removal system (142),
wherein the controller (158) is further programmed to remove a remnant of the at least one composite ply (106) from the ply support surface (108) using the scrap removal system (142) after the at least one composite ply (106) is cut into the predetermined shape.

Clause 27. The system (100) of Clause 24, wherein:
the ply carrier (104) further comprises:
a base plate (124) comprising a plurality of vacuum apertures (128); and
a film (126) positioned on the base plate (124) and forming the ply support surface (108); and
the controller (158) is further programmed to selectively apply a retention vacuum to the plurality of vacuum apertures (128) to retain the film (126) on the base plate (124) using the carrier transfer device (110).

Clause 28. The system (100) of Clause 27, wherein the controller (158) is further programmed to:
maintain the retention vacuum to the plurality of vacuum apertures (128) to retain the film (126) on the base plate (124) using the transfer system (116), after removal of the ply carrier (104) from the carrier transfer device (110); and
rotate the ply carrier (104) one hundred eighty degrees about a horizontal axis using the transfer system (116), before application of the at least one composite ply (106) to the at least a portion of the forming surface (118) of the forming tool (120).

Clause 29. The system (100) of Clause 28, wherein the controller (158) is further programmed to selectively remove the retention vacuum from the plurality of vacuum apertures (128) to release the film (126) from the base plate (124) while retaining the base plate (124) using the transfer system (116), after application of the at least one composite ply (106) to the at least a portion of the forming surface (118) of the forming tool (120).

Clause 30. The system (100) of Clause 29, further comprising a film removal system (160), wherein the controller (158) is further programmed to remove the film (126) from the at least one composite ply (106) using the film removal system (160) after being formed over the at least a portion of the forming surface (118) of the forming tool (120).

Clause 31. The system (100) of Clause 29, wherein the controller (158) is further programmed to return the base plate (124) to the carrier transfer device (110) using the transfer system (116).

Clause 32. The system (100) of Clause 24, further comprising a positioning system (144) configured to guide the carrier transfer device (110), wherein the controller (158) is further programmed to selectively position the carrier transfer device (110) relative to the lamination system (112) and the transfer system (116) using the positioning system (144).

Clause 33. The system (100) of Clause 32, wherein the controller (158) is further programmed to operatively translate the carrier transfer device (110) between the lamination system (112) and the transfer system (116) using the positioning system (144).

Clause 34. The system (100) of Clause 32, wherein the controller (158) is further programmed to operatively circulate the carrier transfer device (110) through the lamination system (112) and the transfer system (116) using the positioning system (144).

Clause 35. The system (100) of Clause 32, further comprising a tool transfer device (146) configured to support the forming tool (120), wherein the controller (158) is further programmed to selectively position the tool transfer device (146) relative to the transfer system (116) and the forming system (122) using the positioning system (144).

Clause 36. The system (100) of Clause 35, wherein the controller (158) is further programmed to operatively translate the tool transfer device (146) between the transfer system (116) and the forming system (122) using the positioning system (144).

Clause 37. The system (100) of Clause 35, wherein the controller (158) is further programmed to operatively circulate the tool transfer device (146) through the transfer system (116) and the forming system (122) using the positioning system (144).

Clause 38. The system (100) of Clause 35, further comprising an indexing device (148) configured to operatively locate the carrier transfer device (110), wherein the controller (158) is further programmed to selectively position the carrier transfer device (110) at a plurality of specified locations relative to each one of the lamination system (112) and the transfer system (116) using the indexing device (148).

Clause 39. The system (100) of Clause 38, wherein the controller (158) is further programmed to selectively position the tool transfer device (146) at a plurality of specified locations relative to each one of the transfer system (116) and the forming system (122) using the indexing device (148).

Clause 40. A method (1000) of fabricating a composite structure (102), the method (1000) comprising steps of:

conveying a ply carrier (104) to a lamination system (112) using a carrier transfer device (110);

selectively applying at least one composite ply (106) to a ply support surface (108) of the ply carrier (104) using the lamination system (112);

conveying the ply carrier (104) from the lamination system (112) to a transfer system (116) using the carrier transfer device (110);

removing the ply carrier (104) from the carrier transfer device (110) and applying the at least one composite ply (106) to at least a portion of a forming surface (118) of a forming tool (120) using the transfer system (116); and forming the at least one composite ply (106) over the at least a portion of the forming surface (118) of the forming tool (120) using a forming system (122).

Clause 41. The method (1000) of Clause 40, further comprising:

conveying the ply carrier (104) from the lamination system (112) to a trim system (114) using the carrier transfer device (110);

selectively cutting the at least one composite ply (106) into a predetermined shape using the trim system (114); and conveying the ply carrier (104) from the trim system (114) to a transfer system (116) using the carrier transfer device (110).

Clause 42. The method (1000) of Clause 41, further comprising removing a remnant of the at least one composite ply (106) from the ply support surface (108) using a scrap removal system (142), after the step of selectively cutting the at least one composite ply (106) into a predetermined shape using the trim system (114).

Clause 43. The method (1000) of Clause 40, wherein:

the ply carrier (104) further comprises a base plate (124) and a film (126) positioned on the base plate (124) and forming the ply support surface (108); and the method (1000) further comprises selectively applying a retention vacuum to retain the film (126) on the base plate (124) using the carrier transfer device (110).

Clause 44. The method (1000) of Clause 43, further comprising:

maintaining the retention vacuum to retain the film (126) on the base plate (124) using the transfer system (116), after the step of removing of the ply carrier (104) from the carrier transfer device (110); and rotating the ply carrier (104) one hundred eighty degrees about a horizontal axis using the transfer system (116), before the step of applying the at least one composite ply (106) to the at least a portion of the forming surface (118) of the forming tool (120).

Clause 45. The method (1000) of Clause 44, further comprising selectively removing the retention vacuum to release the film (126) from the base plate (124) while retaining the base plate (124) using the transfer system (116), after the step of applying the at least one composite ply (106) to the at least a portion of the forming surface (118) of the forming tool (120).

Clause 46. The method (1000) of Clause 45, further comprising returning the base plate (124) to the carrier transfer device (110) using the transfer system (116), after the step of applying the at least one composite ply (106) to the at least a portion of the forming surface (118) of the forming tool (120).

Clause 47. The method (1000) of Clause 43, further comprising removing the film (126) from the at least one composite ply (106) using a film removal system (142), after the step of forming the at least one composite ply (106) over the at least a portion of the forming surface (118) of the forming tool (120).

Clause 48. The method (1000) of Clause 40, further comprising operatively translating the carrier transfer device (110) between the lamination system (112) and the transfer system (116).

Clause 49. The method (1000) of Clause 40, further comprising operatively circulating the carrier transfer device (110) through the lamination system (112) and the transfer system (116).

Clause 50. The method (1000) of Clause 40, further comprising conveying the forming tool (120) to the transfer system (116) and the forming system (122) using a tool transfer device (146).

Clause 51. The method (1000) of Clause 50, further comprising operatively translating the tool transfer device (146) between the transfer system (116) and the forming system (122).

Clause 52. The method (1000) of Clause 50, further comprising operatively circulating the tool transfer device (146) through the transfer system (116) and the forming system (122).

Clause 53. The method (1000) of Clause 50, further comprising selectively positioning the carrier transfer device (110) at a plurality of specified locations relative to each one of the lamination system (112) and the transfer system (116) using an indexing device (148).

Clause 54. The method (1000) of Clause 53, further comprising selectively positioning the tool transfer device (146) at a plurality of specified locations relative to each one of the transfer system (116) and the forming system (122) using the indexing device (148).

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A system for fabricating a composite structure, the system comprising:
   a ply carrier comprising:
      a base plate; and
      a film positioned on the base plate, wherein the film forms a ply support surface configured to support at least one composite ply;
   a carrier transfer device configured to convey the ply carrier;
   a lamination system configured to selectively apply the at least one composite ply to the ply support surface of the ply carrier;
   a transfer system configured to remove the ply carrier from the carrier transfer device and to apply the at least one composite ply to at least a portion of a forming surface of a forming tool; and
   a forming system configured to form the at least one composite ply over the at least a portion of the forming surface of the forming tool.

2. The system of claim 1, further comprising a trim system configured to selectively cut the at least one composite ply into a predetermined shape.

3. The system of claim 2, further comprising a scrap removal system configured to remove a remnant of the at least one composite ply from the ply support surface after the at least one composite ply is cut into the predetermined shape.

4. The system of claim 1, further comprising a carrier preparation system configured to apply the film to the base plate.

5. The system of claim 1, wherein:
   the base plate comprises a plurality of vacuum apertures; and
   the carrier transfer device comprises a vacuum table in fluid communication with the plurality of vacuum apertures and configured to apply a retention vacuum to the plurality of vacuum apertures to retain the film on the base plate.

6. The system of claim 1, further comprises an indexing structure configured to operatively locate the ply carrier at a specified location on the carrier transfer device.

7. The system of claim 1, further comprising a positioning system configured to selectively position the carrier transfer device relative to the lamination system and the transfer system.

8. The system of claim 7, further comprising a tool transfer device configured to convey the forming tool,
   wherein the positioning system is further configured to selectively position the tool transfer device relative to the transfer system and the forming system.

9. The system of claim 8, further comprising an indexing device configured to operatively locate the carrier transfer device at a plurality of specified locations relative to each one of the lamination system and the transfer system.

10. The system of claim 9, wherein the indexing device is further configured to operatively locate the tool transfer device at a plurality of specified locations relative to each one of the transfer system and the forming system.

11. The system of claim 1, further comprising a controller programmed to control operation of at least one of: the carrier transfer device, the lamination system and the transfer system and the forming system.

12. A system for fabricating a composite structure, the system comprising:
   a ply carrier comprising:
      a base plate; and
      a film positioned on the base plate, wherein the film forms a ply support surface;
   a carrier transfer device configured to support and convey the ply carrier;
   a lamination system configured to apply at least one composite ply to the ply support surface of the ply carrier;
   a transfer system in sequential relation to the lamination system and configured to remove the ply carrier from the carrier transfer device and to apply the at least one composite ply to at least a portion of a forming surface of a forming tool;
   a forming system in sequential relation to the transfer system and configured to form the at least one composite ply over the at least a portion of the forming surface of the forming tool; and
   a controller programmed to control operation of the carrier transfer device, the lamination system, the transfer system, and the forming system.

13. The system of claim 12, further comprising a trim system in sequential relation between the lamination system and the transfer system and configured to selectively cut the at least one composite ply into a predetermined shape,
wherein the controller is further programmed to control operation of the trim system.

14. The system of claim 13, further comprising a scrap removal system configured to remove a remnant of the at least one composite ply from the ply support surface after the at least one composite ply is cut into the predetermined shape,
wherein the controller is further programmed to control operation of the scrap removal system.

15. The system of claim 12, wherein:
the base plate comprising a plurality of vacuum apertures;
the carrier transfer device comprises a vacuum table in fluid communication with the plurality of vacuum apertures and configured to apply a retention vacuum to the plurality of vacuum apertures to retain the film on the base plate; and
the controller is further programmed to control operation of the vacuum table.

16. The system of claim 12, further comprising a film removal system configured to remove the film from the at least one composite ply using the film removal system after being formed over the at least a portion of the forming surface of the forming tool,
wherein the controller is further programmed to control operation of the film removal system.

17. The system of claim 12, further comprising a positioning system configured to guide and selectively position the carrier transfer device relative to the lamination system and the transfer system,
wherein the controller is further programmed to control operation of the positioning system.

18. A method of fabricating a composite structure, the method comprising steps of:
selectively applying at least one composite ply to a ply support surface of a ply carrier using a lamination system, wherein the ply carrier comprises a base plate and a film positioned on the base plate that forms the ply support surface;
conveying the ply carrier from the lamination system to a transfer system using a carrier transfer device;
removing the ply carrier from the carrier transfer device and applying the at least one composite ply to at least a portion of a forming surface of a forming tool using the transfer system; and
forming the at least one composite ply over the at least a portion of the forming surface of the forming tool using a forming system.

19. The method of claim 18, further comprising:
conveying the ply carrier from the lamination system to a trim system using the carrier transfer device;
selectively cutting the at least one composite ply into a predetermined shape using the trim system; and
conveying the ply carrier from the trim system to the transfer system using the carrier transfer device.

20. The method of claim 19, further comprising removing a remnant of the at least one composite ply from the ply support surface using a scrap removal system, after the step of selectively cutting the at least one composite ply into a predetermined shape using the trim system.

21. The method of claim 19, further comprises comprising selectively applying a retention vacuum to retain the film on the base plate using the carrier transfer device.

22. The method of claim 18 further comprising operatively translating the carrier transfer device between the lamination system and the transfer system.

23. The method of claim 18, further comprising operatively circulating the carrier transfer device through the lamination system and the transfer system.

24. The method of claim 18, further comprising conveying the forming tool to the transfer system and the forming system using a tool transfer device.

* * * * *